(12) United States Patent
Takahashi et al.

(10) Patent No.: US 10,708,459 B2
(45) Date of Patent: Jul. 7, 2020

(54) IMAGE FORMING APPARATUS, SERVER, CONTROL PROGRAM OF IMAGE FORMING APPARATUS, AND CONTROL PROGRAM OF SERVER

(71) Applicant: Konica Minolta, Inc., Chiyoda-ku, Tokyo (JP)

(72) Inventors: Kazusei Takahashi, Nishinomiya (JP); Yuki Asai, Itami (JP); Katsuhiko Akita, Amagasaki (JP); Shinya Hashimoto, Nishinomiya (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/444,268

(22) Filed: Jun. 18, 2019

(65) Prior Publication Data

US 2019/0394341 A1    Dec. 26, 2019

(30) Foreign Application Priority Data

Jun. 22, 2018    (JP) .................................. 2018-119273

(51) Int. Cl.
*G06F 3/12* (2006.01)
*H04N 1/00* (2006.01)
(Continued)

(52) U.S. Cl.
CPC ......... *H04N 1/0088* (2013.01); *G06F 9/4418* (2013.01); *G06F 16/1873* (2019.01);
(Continued)

(58) Field of Classification Search
CPC ............. H04N 1/0088; H04N 1/00244; H04N 1/0097; H04N 1/00896; H04N 2201/0094;
(Continued)

(56) References Cited

U.S. PATENT DOCUMENTS 6,269,456 B1 *   7/2001  Hodges ..................... G06F 8/65
                                                                714/38.1
2002/0199116 A1 * 12/2002 Hoene ................... G06F 21/562
                                                                 726/24

(Continued)

FOREIGN PATENT DOCUMENTS

JP       2004-240796 A      8/2004
JP       2008-047123 A      2/2008
(Continued)

*Primary Examiner* — Moustapha Diaby
(74) *Attorney, Agent, or Firm* — BakerHostetler

(57) ABSTRACT

Disclosed is an image forming apparatus that may communicate with a server, which may include: a storage that stores a virus pattern file; and a hardware processor that discriminates, when a transition is made from a state in which power supply to the hardware processor is interrupted to a state in which the power supply to the hardware processor is made, whether the virus pattern file in the storage is a latest version, in communication with the server, includes an updater that updates, when discriminating that the virus pattern file is not the latest version, the virus pattern file to a virus pattern file from the server, discriminates whether a job accepted is a first type of job using data from outside the image forming apparatus or a second type of job using data generated inside the image forming apparatus, and executes the first type after the update by the updater.

15 Claims, 16 Drawing Sheets

(51) Int. Cl.
    *G06F 16/18*     (2019.01)
    *G06F 16/23*     (2019.01)
    *G06F 9/4401*    (2018.01)
    *H04L 29/06*     (2006.01)

(52) U.S. Cl.
    CPC ........ *G06F 16/2379* (2019.01); *H04L 63/145* (2013.01); *H04N 1/0097* (2013.01); *H04N 1/00244* (2013.01); *H04N 1/00896* (2013.01); *H04N 2201/0094* (2013.01)

(58) Field of Classification Search
    CPC ............. G06F 16/1873; G06F 16/2379; G06F 9/4418; H04L 63/145
    See application file for complete search history.

(56) References Cited

U.S. PATENT DOCUMENTS

| | | | | |
|---|---|---|---|---|
| 2007/0288423 | A1* | 12/2007 | Kimoto | G06F 8/65 |
| 2011/0138469 | A1* | 6/2011 | Ye | G06F 21/577 |
| | | | | 726/25 |
| 2011/0276956 | A1* | 11/2011 | Yuki | G06F 8/65 |
| | | | | 717/170 |
| 2013/0057910 | A1* | 3/2013 | Matsumoto | G06K 15/402 |
| | | | | 358/1.15 |

FOREIGN PATENT DOCUMENTS

| | | | |
|---|---|---|---|
| JP | 2010-167705 A | 8/2010 | |
| JP | 2014-115776 A | 6/2014 | |

* cited by examiner

FIG. 3

VIRAL INFECTION RISK TABLE 113

| TYPE OF JOB | CLASSIFICATION OF JOB | VIRAL INFECTION RISK |
|---|---|---|
| PC PRINT | FIRST TYPE | HIGH |
| COPY | SECOND TYPE | LOW |
| FACSIMILE RECEPTION | FIRST TYPE | MODERATE |
| Scan to E-mail | SECOND TYPE | LOW |
| Scan to BOX | SECOND TYPE | LOW |
| E-mail RECEPTION | FIRST TYPE | HIGH |
| E-mail TRANSMISSION | SECOND TYPE | LOW |
| USB PRINT | FIRST TYPE | HIGH |
| .... | .... | .... |

UPDATE HISTORY DATABASE AND SCAN HISTORY DATABASE

| IMAGE FORMING APPARATUS | UPDATE HISTORY (VERSION INFORMATION) | SCAN HISTORY |
|---|---|---|
| IMAGE FORMING APPARATUS A | Ver. 1 | JUNE 2nd, 2018, 06:11 |
| IMAGE FORMING APPARATUS B | Ver. 1.1 | NOVEMBER 3rd, 2018, 23:11 |
| IMAGE FORMING APPARATUS C | Ver. 1 | AUGUST 2nd, 2018, 06:11 |
| IMAGE FORMING APPARATUS D | Ver. 1.1 | OCTOBER 29th, 2018, 07:25 |
| ... | ... | ... |

FIG. 10

SEQUENCE INFORMATION No. XX, USB PRINT 114

| TASK ID | PROCESSING DETAIL | ACCESS-DESTINATION DEVICE | ORDER OF EXECUTION IN NORMAL PROCESSING | VIRAL INFECTION RISK | ORDER OF EXECUTION IN UPDATE OF VIRUS PATTERN FILE |
|---|---|---|---|---|---|
| 1 | FOLDER/FILE VERIFICATION FOR USB MEMORY | USB MEMORY (EXTERNAL DEVICE) | 1 | HIGH | After 1 |
| 2 | FILE OPEN FOR USB MEMORY | USB MEMORY (EXTERNAL DEVICE) | 2 | HIGH | After 2 |
| 3 | PANEL DISPLAY OF OPERATION MENU | LCD PANEL (INTERNAL DEVICE) | 3 | LOW | Pre 1 |
| 4 | USER INPUT ACCEPTANCE OF OPERATION PARAMETERS | LCD PANEL (INTERNAL DEVICE) | 4 | LOW | Pre 2 |
| 6 | FILE PRINT PROCESSING (PRINT DATA CREATION) | USB MEMORY (EXTERNAL DEVICE) | 5 | HIGH | After 3 |
| 7 | PRINT SCREEN PREVIEW DISPLAY | LCD PANEL (INTERNAL DEVICE) | 6 | LOW | After 4 |
| 8 | PRINT SETTING FINAL VERIFICATION (CHANGE ACCEPTANCE AND SETTING DETERMINATION) | LCD PANEL (INTERNAL DEVICE) | 7 | LOW | After 5 |
| 9 | PRINT PROCESSING | USB MEMORY (EXTERNAL DEVICE) AND PRINT ENGINE (INTERNAL DEVICE) | 8 | HIGH | After 6 |
| 10 | FILE CLOSE FOR USB MEMORY | USB MEMORY (EXTERNAL DEVICE) | 9 | HIGH | After 7 |

IMAGE FORMING APPARATUS, SERVER, CONTROL PROGRAM OF IMAGE FORMING APPARATUS, AND CONTROL PROGRAM OF SERVER

CROSS REFERENCE TO RELATED APPLICATIONS

This application claims priority to Japanese patent Application No. 2018-119273, filed on Jun. 22, 2018, which is incorporated herein by reference in its entirety.

BACKGROUND

Technological Field

The present disclosure relates to an image forming apparatus, a server, a control program of the image forming apparatus, and a control program of the server. More specifically, the present disclosure relates to an image forming apparatus, a server, a control program of the image forming apparatus, and a control program of the server that enable reduction of the possibility of viral infection of the image forming apparatus.

Description of the Related Art

Examples of an electrophotographic image forming apparatus include a multi function peripheral (MFP) having a scanner function, a facsimile function, a copier function, a printer function, a data-communication function, and a server function, a facsimile device, a copier, and a printer.

An image forming apparatus is connected to external equipment, such as a personal computer (PC), a mobile terminal (e.g., a smartphone), or another image forming apparatus through a network. The image forming apparatus executes a job using a file received from the external equipment. The image forming apparatus executes a job using a file saved in a universal serial bus (USB) memory connected through a USB terminal.

In recent years, the viral infection damage of PCs and mobile terminals has occurred frequently, resulting in trouble. Conventionally, the viral infection damage of image forming apparatuses has not been much considered as trouble. However, such an image forming apparatus that is one piece of information equipment, communicates with various types of external equipment. Thus, a situation in which the image forming apparatus is infected with a virus, resulting in a source of spreading the virus to the external equipment, requires avoiding.

Thus, a technique has been proposed that installation of anti-virus software on an image forming apparatus gives the image forming apparatus a function of detecting a file infected with a virus. According to the technique, the image forming apparatus performs virus scanning to a target, such as a file received by the image forming apparatus from external equipment or a file that the image forming apparatus saves inside from an USB memory.

Examples of a conventional technique regarding virus scanning that have been disclosed, include JP 2008-047123 A, JP 2004-240796 A, JP 2014-115776 A, and JP 2010-167705 A. JP 2008-047123 A discloses a real-time computer-virus infection prevention device including two anti-virus modules each including a virus scanning engine and a virus database. In this device, update of the virus scanning engine and the virus database of one of the two anti-virus modules, causes the other anti-virus module to be used for file monitoring to a computer virus.

JP 2004-240796 A discloses a virus definition file update device that updates a virus definition file of a user terminal for the latest version, through a communication network. The device includes: a virus definition file selector selects, in a case where the revised generation of the virus definition file is earlier by a predetermined number of generations than the latest version and the communication rate of the communication network is slower than a predetermined rate, at least one of the respective virus definition files of intermediate generations between the respective revised generations of the current situation and the latest, and selects a difference file between the respective virus definition files of the current situation and an intermediate generation, a difference file between the respective virus definition files of the intermediate generations, and a difference file between the respective virus definition files of the intermediate generation and the latest; a file transmitter that transmits the difference files selected by the virus definition file selector; and a communication rate measurer that measures a communication rate.

JP 2014-115776 A discloses an image processing apparatus including a main controller and a sub-controller. The image processing apparatus includes: a power controller that controls the image processing apparatus either in a first power mode in which the main controller is allowed to receive a job and power is supplied to the sub-controller or in a second power mode in which the main controller is allowed to receive a job and no power is supplied to the sub-controller; an updater that updates firmware; a specifier that specifies firmware to be updated; and a detector that detects satisfaction of the transition condition from the first power mode to the second power mode, in which, in a case where the specified firmware to be updated is the firmware of the sub-controller, the updater updates the firmware of the sub-controller after the satisfaction of the transition condition, and the power controller makes a transition from the first power mode to the second power mode after completion of the update of the firmware of the sub-controller.

JP 2010-167705 A discloses an image forming apparatus equipped with a sleep mode, that calculates the amount of power increasing in response to the timing of execution of a print job transmitted by a user. At the start of execution of the print job, the image forming apparatus calculates, in a case where the image forming apparatus is in the sleep mode, the increase of power consumption on the basis of the time of transition to the sleep mode, calculates, in a case where the image forming apparatus is in wake-up, the increase of power consumption on the basis of the time from the completion of execution of the previous print job to the start of the print job, and calculates and displays the degree of contribution to power saving on the basis of the calculated increase of power consumption with the increase of power consumption in the sleep mode as a criterial value.

In terms of energy saving, a large number of image forming apparatuses each transition to a sleep mode in which power supply is stopping to a member in part of the image forming apparatus, in a case where neither an operation of a user nor entry of a job is accepted for a certain time.

Conventionally, virus scanning and update of a virus pattern file are performed on the previously set day and time. In a case where the image forming apparatus is in the sleep mode, neither virus scanning nor update of the virus pattern file is performed even when the previously set day and time come. In a case where the image forming apparatus recovers from the sleep mode, virus scanning and update of the virus pattern file are performed.

As a result, in a case where an external task that is a task of making access outside the image forming apparatus, is executed immediately after the image forming apparatus recovers from the sleep mode, the image forming apparatus makes access outside the image forming apparatus with the virus pattern file not being updated. As a result, in a case where data outside the image forming apparatus is infected with a virus, the anti-virus software does not function sufficiently, resulting in a situation in which the image forming apparatus is infected with the virus.

SUMMARY

The present disclosure has been made in order to solve one or more problems of prior, known techniques, and an object of the present disclosure is to provide an image forming apparatus, a server, a control program of the image forming apparatus, and a control program of the server that enable reduction of the possibility of viral infection of the image forming apparatus.

To achieve the abovementioned object, according to an aspect of the present disclosure, an image forming apparatus that communicates with a server reflecting one aspect of the present disclosure may comprise: a storage that stores a virus pattern file; and a hardware processor, wherein the hardware processor discriminates, in a case where a transition is made from a state in which power supply to the hardware processor is interrupted to a state in which the power supply to the hardware processor is made, whether the virus pattern file stored in the storage is a latest version, in communication with the server, the hardware processor includes an updater that updates, in a case where the hardware processor discriminates that the virus pattern file stored in the storage is not the latest version, the virus pattern file stored in the storage to a virus pattern file acquired from the server, the hardware processor discriminates whether a job accepted is a first type of job using data acquired from outside the image forming apparatus or a second type of job using data generated inside the image forming apparatus, and the hardware processor executes the first type of job after the update by the updater.

BRIEF DESCRIPTION OF THE DRAWINGS

The advantages and features provided by one or more embodiments of the disclosure will become more fully understood from the detailed description given hereinbelow and the appended drawings which are given by way of illustration only, and thus are not intended as a definition of the limits of the present disclosure:

FIG. 3 is a schematic illustration of a viral infection risk table stored in a storage device of the image forming apparatus according to the first embodiment of the present disclosure;

FIG. 10 is a schematic illustration of sequence information regarding USB print stored in a storage device of an image forming apparatus according to a second embodiment of the present disclosure;

DETAILED DESCRIPTION OF EMBODIMENTS

Hereinafter, one or more embodiments of the present disclosure will be described with reference to the drawings. However, the scope of the disclosure is not limited to the disclosed embodiments.

According to each embodiment, an image forming apparatus that is an MFP will be described. The image forming apparatus may be a facsimile device, a copier, or a printer, instead of the MFP.

First Embodiment

First, the configuration of an image forming system according to the present embodiment will be described.

Figure 1:
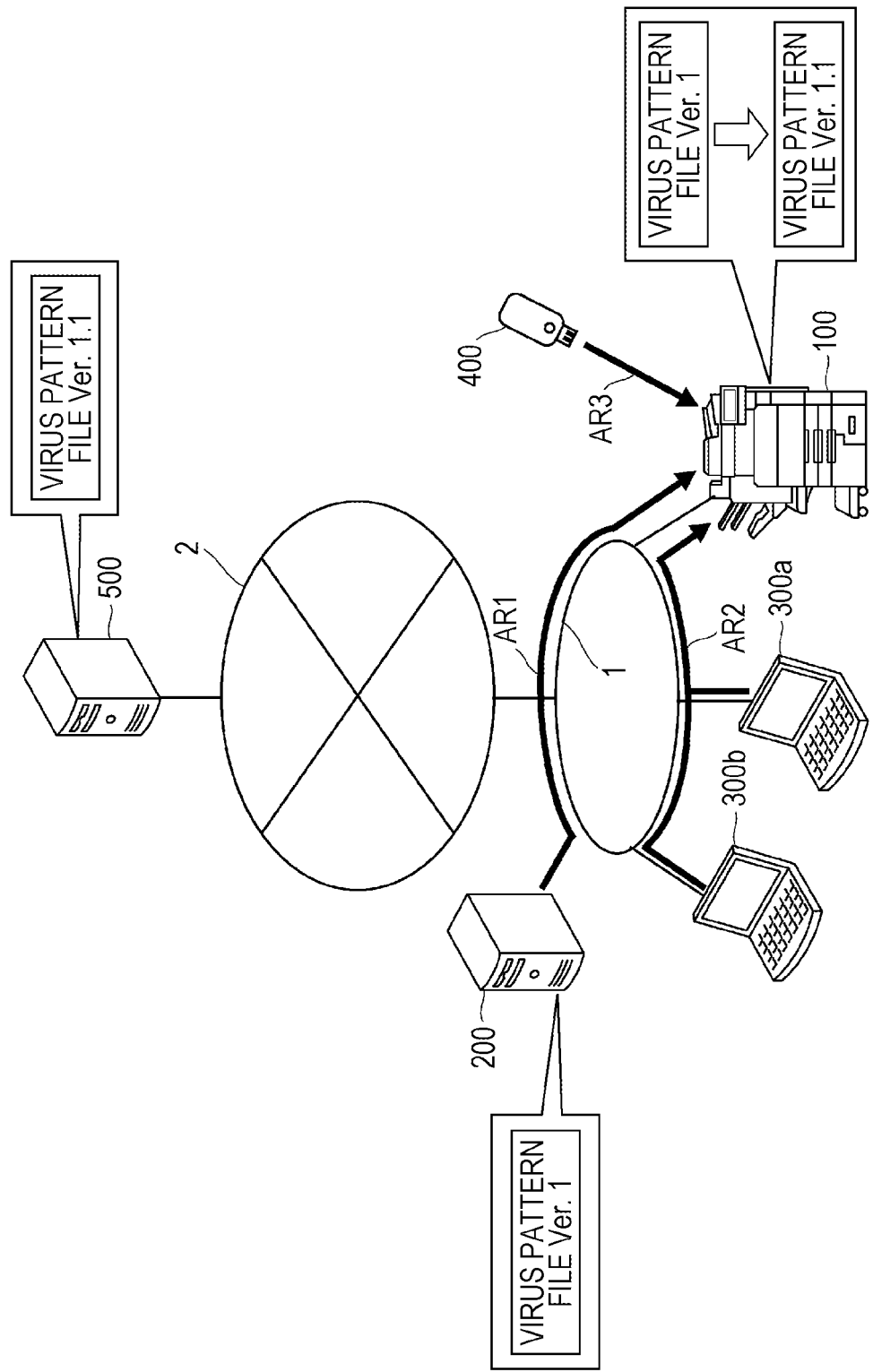
FIG. 1 is a conceptual illustration of the configuration of an image forming system according to a first embodiment of the present disclosure.

FIG. 1 is a conceptual illustration of the configuration of the image forming system according to the first embodiment of the present disclosure.

Referring to FIG. 1, the image forming system according to the present embodiment, includes an image forming apparatus 100 (exemplary image forming apparatus), a management server 200 (exemplary server), PCs 300*a* and 300*b*, and a cloud server 500. The image forming apparatus 100, the management server 200, and the PCs 300a and 300b in a local area network (LAN), are capable of communicating mutually through a dedicated line 1. The cloud server 500 is provided outside the LAN. The management server 200 and the cloud server 500 are capable of communicating mutually through the Internet 2.

The cloud server 500 is managed by a service provider for anti-virus software. The management server 200 stores a virus pattern file. The management server 200 acquires the latest virus pattern file from the cloud server 500 at necessary timing, and updates the virus pattern file retained by the management server 200.

The image forming apparatus 100 has the anti-virus software including a virus pattern file, installed thereon. As indicated with an arrow AR1, the image forming apparatus 100 acquires the latest virus pattern file from the management server 200 at necessary timing, and updates the virus pattern file retained in the image forming apparatus 100. The image forming apparatus 100 executes virus scanning to data that the image forming apparatus 100 uses or retains, at necessary timing.

As indicated with an arrow AR2, the image forming apparatus 100 receives a job from each of the PCs 300a and 300b. The job includes data to be used in the job.

As indicated with an arrow AR3, the image forming apparatus 100 receives a job through an operation panel 120. For example, the job uses data saved in a USB memory 400 connected through a USB terminal of the image forming apparatus 100.

Note that the image forming system may further include equipment, such as another image forming apparatus or a PC connected through the dedicated line 1.

Figure 2:
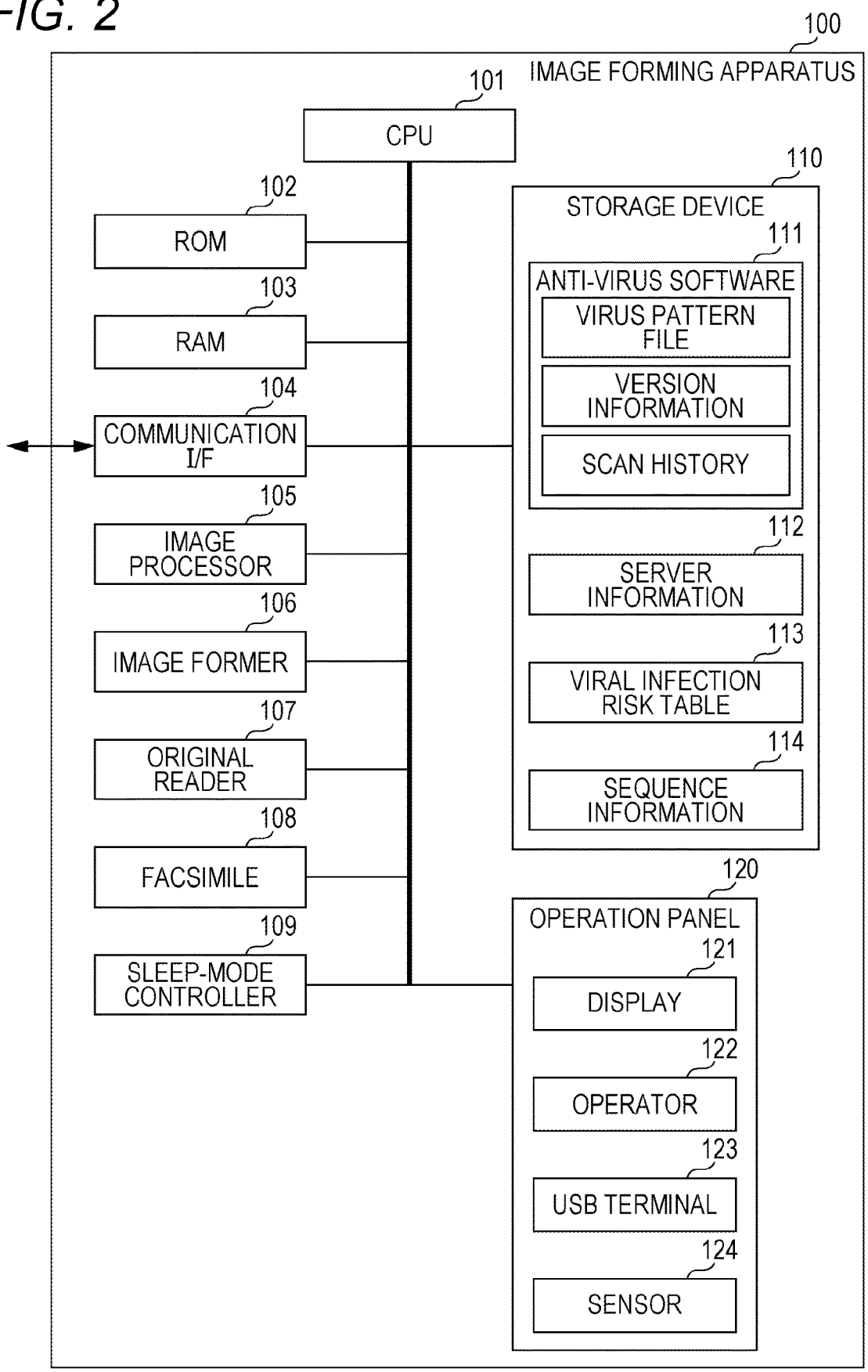
FIG. 2 is a block diagram of the configuration of an image forming apparatus according to the first embodiment of the present disclosure.

FIG. 2 is a block diagram of the configuration of the image forming apparatus 100 according to the first embodiment of the present disclosure.

Referring to FIG. 2, the image forming apparatus 100 includes a central processing unit (CPU) 101 (exemplary controller, job discriminator, and executor), a read only memory (ROM) 102, a random access memory (RAM) 103, a communication interface 104 (exemplary acceptor), an image processor 105, an image former 106, an original reader 107, a facsimile 108, a sleep-mode controller 109, a storage device 110 (exemplary storage), and the operation panel 120 (exemplary acceptor and operation acceptor). The CPU 101, the ROM 102, the RAM 103, the communication interface 104, the image processor 105, the image former 106, the original reader 107, the facsimile 108, the sleep-mode controller 109, the storage device 110, and the operation panel 120 are connected mutually.

The CPU 101 controls the entire image forming apparatus 100 for various jobs, such as a scan job, a copy job, a mail transmission job, and a print job. The CPU 101 executes a control program stored in the ROM 102.

For example, the ROM 102 is a flash ROM. The ROM 102 stores various programs to be executed by the CPU 101 and various types of fixed data. The ROM 102 may be non-rewritable.

The RAM 103 is a main memory for the CPU 101. For example, the RAM 103 is used to temporarily store data necessary for the CPU 101 to execute the various programs, or image data. The RAM 103 temporarily stores settings accepted from a user for a job that the image forming apparatus 100 executes.

The communication interface 104 communicates with external equipment, with a communication protocol, such as TCP/IP, in accordance with an instruction from the CPU 101. The communication interface 104 receives a job from the external equipment.

For example, the image processor 105 performs conversion processing of converting data received from outside to a necessary format or conversion processing of converting data to be transmitted outward to a necessary format.

The image former 106 forms an image on a sheet, on the basis of image data processed by the image processor 105.

The original reader 107 reads an original image to generate read data.

The facsimile 108 performs transmission and reception of facsimile data with other equipment.

The sleep-mode controller 109 switches the state of power supply to each member in the image forming apparatus 100, between in a normal mode and in a sleep mode more in power saving than the normal mode. Note that the image forming apparatus 100 may have a mode other than the normal mode and the sleep mode.

The storage device 110 including an auxiliary storage device, such as a hard disk drive (HDD), stores various types of data. For example, the storage device 110 stores the anti-virus software 111, server information 112, a viral infection risk table 113, and sequence information 114 (to be used in a second embodiment). For example, the anti-virus software 111 includes the virus pattern file, version information regarding the virus pattern file, and scan history including the date and time of virus scanning executed by the image forming apparatus 100 until now. For example, the server information 112 includes an account necessary for connection with the management server 200 and the internet protocol (IP) address of the management server 200.

For example, the operation panel 120 includes: a display 121 that displays various types of information to the user; an operator 122 that accepts the respective inputs of various operations from the user; the USB terminal 123 to which equipment having an USB terminal, such as an USB memory, is connected; and a sensor 124 that detects an operation in a case where the image forming apparatus 100 is in the sleep mode.

The sleep-mode controller 109 causes the image forming apparatus 100 to transition from the normal mode to the sleep mode, for example, in a case where neither entry of a new job nor an operation is accepted for a certain time. In the sleep mode, power supply is interrupted to the members in the image forming apparatus 100 (e.g., the member of the CPU 101) except the communication interface 104, the sleep-mode controller 109, and the sensor 124.

For example, in a case where the image forming apparatus 100 in the sleep mode accepts entry of a new job and an operation, the sleep-mode controller 109 causes the image forming apparatus 100 to recover from the sleep mode to the normal mode. In the normal mode, power is supplied to all the members including the CPU 101 in the image forming apparatus 100.

FIG. 3 is a schematic illustration of the viral infection risk table 113 stored in the storage device 110 of the image forming apparatus 100 according to the first embodiment of the present disclosure.

Referring to FIG. 3, the viral infection risk table 113 describes the relationship between the type of job that the image forming apparatus 100 receives, the classification of job (a first type of job using data acquired from outside the image forming apparatus 100 or a second type of job using data generated inside the image forming apparatus 100), and the degree of risk at which the image forming apparatus 100 is infected with a virus in execution of the job by the image forming apparatus 100.

According to the viral infection risk table, the respective jobs of PC print (job of printing data received from a PC), E-mail reception, and USB print (job of printing data saved in the USB memory connected to the image forming apparatus 100) belong to the first type of job using data acquired from outside the image forming apparatus 100. Thus, the viral infection risk is high.

Although the job of Facsimile reception belongs to the first type of job, the viral infection risk is moderate. This is because the possibility of viral infection of data received by facsimile is low.

Because the respective jobs of Copy, Scan to E-mail (job of transmitting image data read by the image forming apparatus 100, by e-mail), Scan to BOX (job of saving image data read by the image forming apparatus 100, into a storage area of the user in the storage device 110), and E-mail transmission belong to the second type of job using data generated inside the image forming apparatus 100. Thus, the viral infection risk is low.

Figure 4:
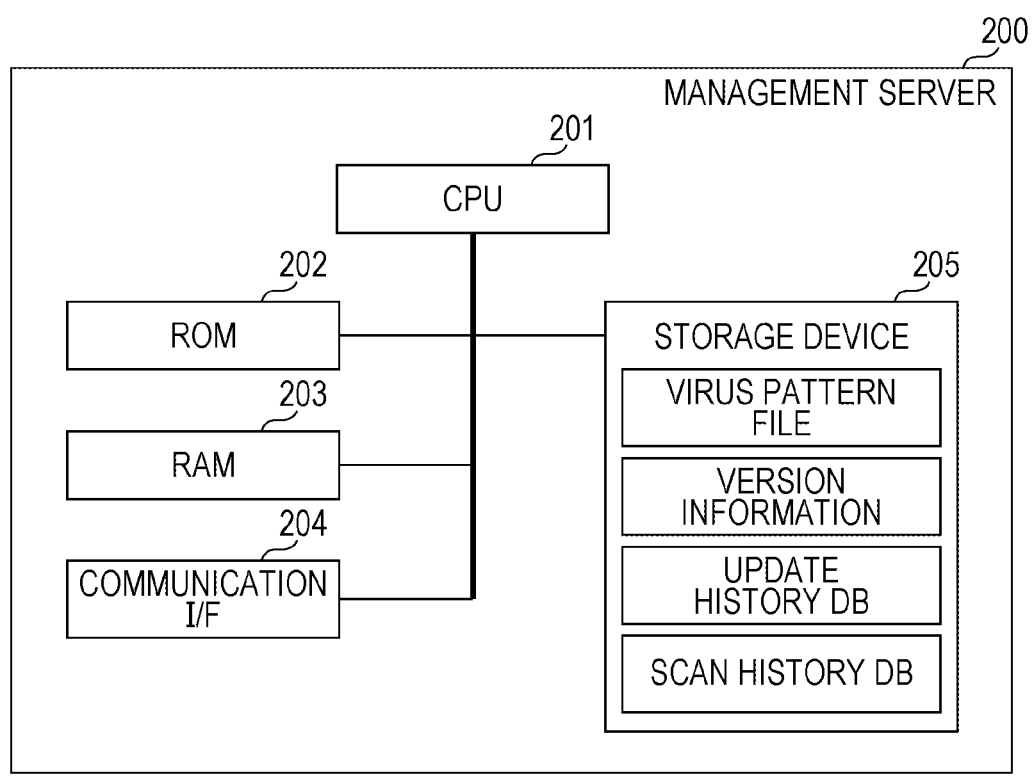
FIG. 4 is a block diagram of the configuration of a management server according to the first embodiment of the present disclosure.

FIG. 4 is a block diagram of the configuration of the management server 200 according to the first embodiment of the present disclosure.

Referring to FIG. 4, the management server 200 manages the equipment (except the cloud server 500) in the image forming system. The management server 200 includes a CPU 201 (exemplary file discriminator, sleep discriminator, scan discriminator, and first and second history updaters), a ROM 202, a RAM 203, a communication interface 204 (exemplary update requester, recoverer, update-completion receiver, scan requester, scan-completion receiver, and sleep starter), and a storage device 205 (exemplary storage). The CPU 201, the ROM 202, the RAM 203, the communication interface 204, and the storage device 205 are connected mutually.

The CPU 201 controls the entire management server 200. The CPU 201 executes a control program stored in the ROM 202.

For example, the ROM 202 is a flash ROM. The ROM 202 stores various programs to be executed by the CPU 201 and various types of fixed data. The ROM 202 may be non-rewritable.

The RAM 203 is a main memory for the CPU 201. For example, the RAM 203 is used to temporarily store data necessary for the CPU 201 to execute the various programs, or image data.

The communication interface 204 communicates with external equipment, with a communication protocol, such as TCP/IP, in accordance with an instruction from the CPU 201.

The storage device 205 including an auxiliary storage device, such as an HDD, stores various types of data. For example, the storage device 205 stores the virus pattern file, version information regarding the virus pattern file, an update history database, and a scan history database.

Figures 5, 6:
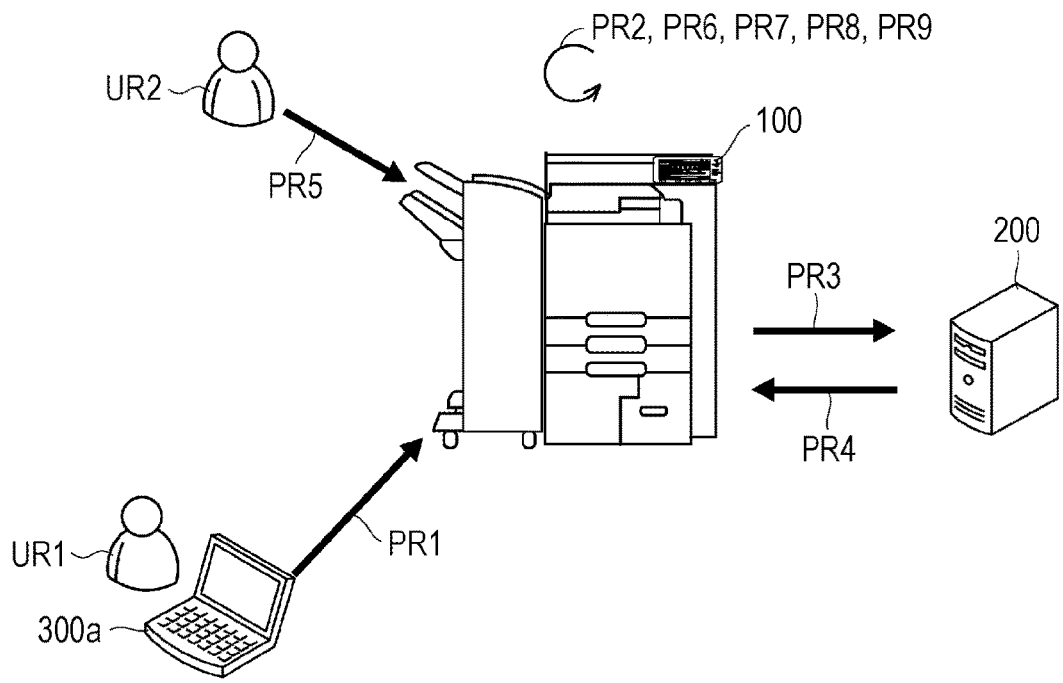
FIG. 5 is a schematic illustration of an update history database and a scan history database stored in a storage device according to the first embodiment of the present disclosure.
FIG. 6 is a schematic illustration of the operation of the image forming system according to the first embodiment of the present disclosure.

FIG. 5 is a schematic illustration of the update history database and the scan history database stored in the storage device 205, according to the first embodiment of the present disclosure.

Referring to FIG. 5, the update history database includes an update history regarding the respective virus pattern files retained by a plurality of image forming apparatuses (plurality of image forming apparatuses under the management of the management server 200) in the image forming system (here, the version of virus pattern file) (hereinafter, also referred to as update history). The scan history database includes scan history regarding the plurality of image forming apparatuses 100 in the image forming system.

Here, the update history and the scan history regarding four image forming apparatuses of an image forming apparatus A, an image forming apparatus B, an image forming apparatus C, and an image forming apparatus D under the management of the management server 200, are indicated. The image forming apparatus 100 of FIG. 1 corresponds to the image forming apparatus A. The version of the virus pattern file retained by the image forming apparatus 100 indicates "Ver. 1", and the scan history of the image forming apparatus 100 indicates "Jun. 2, 2018, 6:11 am".

In a case where a notification is accepted from a related image forming apparatus, the CPU 201 updates the update history and the scan history.

Next, the operation of the image forming system according to the present embodiment, will be described.

FIG. 6 is a schematic illustration of the operation of the image forming system according to the first embodiment of the present disclosure.

Referring to FIG. 6, the image forming apparatus 100 in the sleep mode accepts a job A from a user UR1 (processing PR1). The job A received through the communication interface 104 after transmission from the PC 300*a*, belongs to the first type of job (e.g., a print job of printing data received from outside the image forming apparatus 100 or an e-mail reception job of receiving an e-mail from outside the image forming apparatus 100).

After acceptance of the job A, the sleep-mode controller 109 of the image forming apparatus 100 causes the image forming apparatus 100 to recover from the sleep mode to the normal mode (processing PR2).

The image forming apparatus 100 that has recovered from the sleep mode, communicates with the management server 200, to discriminate whether the virus pattern file retained by the image forming apparatus 100 is the latest version. Specifically, the image forming apparatus 100 inquires of the management server 200 whether the virus pattern file retained by the image forming apparatus 100 is the latest version (processing PR3).

The management server 200 compares the version information regarding the virus pattern file stored in the storage device 205 with the update history of the image forming apparatus 100 described in the update history database, to determine whether the virus pattern file retained by the image forming apparatus 100 is the latest version. Then, the management server 200 transmits a result of the determination as a reply, to the image forming apparatus 100. The image forming apparatus 100 receives the reply to the inquiry (processing PR4).

In the processing PR4, in a case where receiving the reply indicating that the virus pattern file retained by the image forming apparatus 100 is the latest version, the image forming apparatus 100 determines that the virus pattern file retained by the image forming apparatus 100 requires no updating, and in a case where receiving the reply indicating that the virus pattern file retained by the image forming apparatus 100 is not the latest version, the image forming apparatus 100 determines that the virus pattern file retained by the image forming apparatus 100 requires updating. Here, the image forming apparatus 100 determines that the virus pattern file retained by the image forming apparatus 100 requires updating.

Note that a method in which the image forming apparatus 100 determines whether the virus pattern file retained by the image forming apparatus 100 is the latest version, may be the following method (a) or (b), instead of the method described above.

(a) The image forming apparatus 100 requests the management server 200 to transmit the version information regarding the virus pattern file retained by the management server 200. The image forming apparatus 100 compares the version information received from the management server 200 with the version information regarding the virus pattern file retained by the image forming apparatus 100, to determine whether the virus pattern file retained by the image forming apparatus 100 is the latest version. In this case, the management server 200 does not necessarily retain the update history database of the image forming apparatus 100.

(b) The image forming apparatus 100 inquires of the management server 200 whether the virus pattern file retained by the image forming apparatus 100 is the latest version, and additionally transmits the version information regarding the virus pattern file retained by the image forming apparatus 100, to the management server 200. The management server 200 compares the version information regarding the virus pattern file received from the image forming apparatus 100, with the version information regarding the virus pattern file retained by the management server 200, to determine whether the virus pattern file retained by the image forming apparatus 100 is the latest version. Then, the management server 200 transmits a result of the determination as a reply, to the image forming apparatus 100. In this case, the management server 200 does not necessarily retain the update history database of the image forming apparatus 100.

Before completion of update processing of the virus pattern file to be described later and before execution of the job A, the image forming apparatus 100 further receives a job B from a user UR2 through the operation panel 120 (processing PR5). The job B belongs to the second type of job (e.g., a scan job of reading an original image, a copy job of printing the read original image, or an e-mail transmission job of transmitting an e-mail outside the image forming apparatus 100).

In a case where a plurality of unexecuted jobs is accepted before completion of the update processing to be described later, the sleep-mode controller 109 of the image forming apparatus 100 determines the order of execution of the plurality of unexecuted jobs (processing PR6).

In a case where determining that the virus pattern file retained by the image forming apparatus 100 requires updating, in the processing PR6, the image forming apparatus 100 with the viral infection risk table determines the respective viral infection risks of the plurality of unexecuted jobs (whether each accepted job is the first type of job using data acquired from outside the image forming apparatus 100 or the second type of job using data generated inside the image forming apparatus 100), on the basis of the respective types of the plurality of unexecuted jobs. The image forming apparatus 100 determines the order of execution such that a job having a low viral infection risk (second type of job) is executed prior to a job having a high viral infection risk (first type of job). Here, the order of execution of the job B having a low viral infection risk prior to the job A having a high viral infection risk, is determined.

After the determination of the order of execution of the plurality of unexecuted jobs, the image forming apparatus 100 executes the job having a low viral infection risk in the determined order. Here, the image forming apparatus 100 executes the job B (processing PR7).

In a case where discriminating that the virus pattern file retained by the image forming apparatus 100 is not the latest version, the image forming apparatus 100 acquires the latest version of virus pattern file from the management server 200, and starts the processing of updating the virus pattern file stored in the storage device 110 to the acquired virus pattern file (processing PR8). Note that, before the execution of the job B in the processing PR7, the update processing in the processing PR8 may start.

After completion of the job having a low viral infection risk and after completion of the update processing, the image forming apparatus 100 executes the job having a high viral infection risk (here, the job A) (processing PR9). In execution of the job having a high viral infection risk, the image forming apparatus 100 executes virus scanning to the data to be used in the job.

Note that, in a case where the image forming apparatus 100 determines that the virus pattern file retained by the image forming apparatus 100 requires no updating, the image forming apparatus 100 determines the order of execution of the plurality of unexecuted jobs as the same order as that of acceptance of the jobs.

Figure 7:
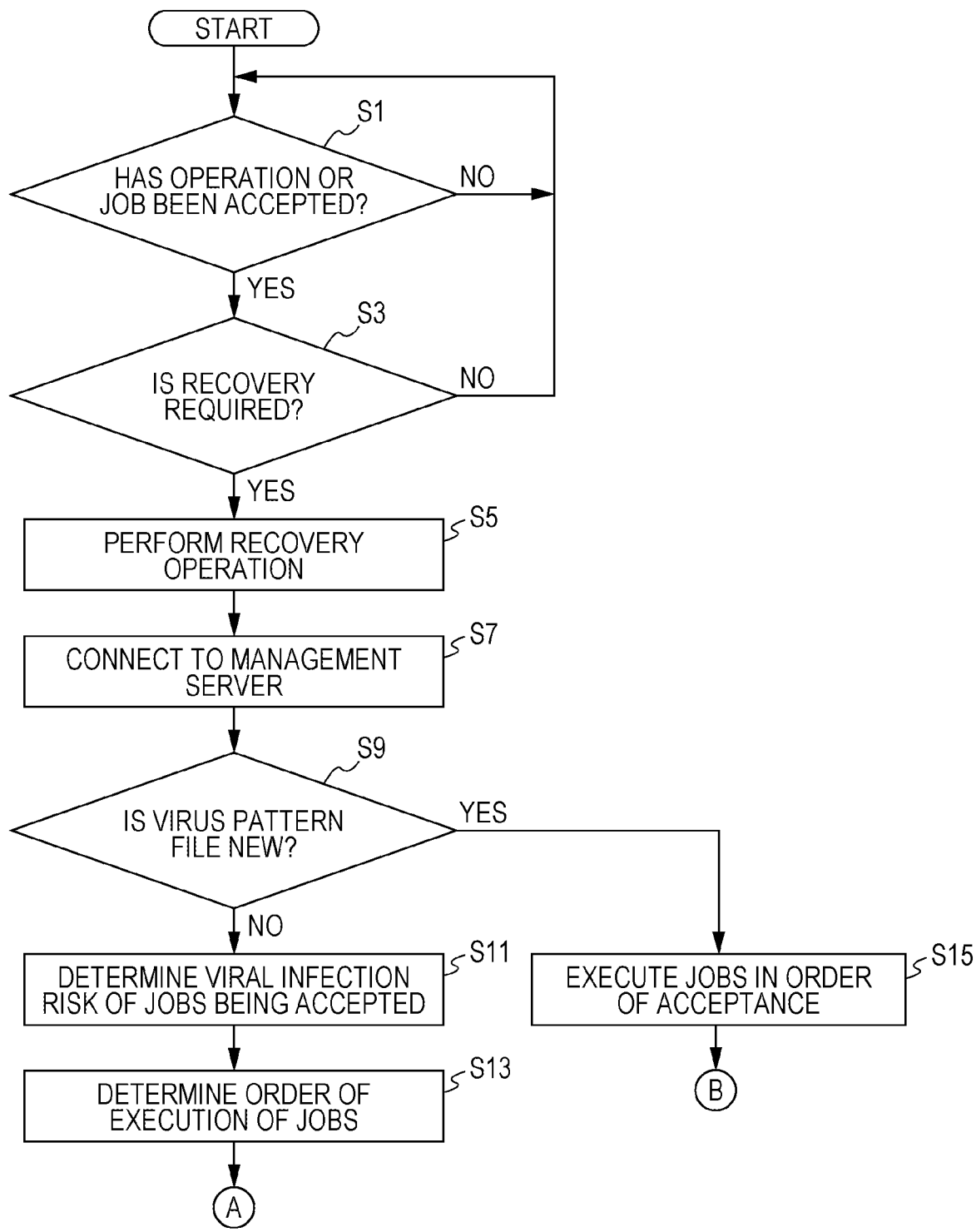
FIG. 7 is a first part of a flowchart of the operation of the image forming apparatus according to the first embodiment of the present disclosure.
Figure 8:
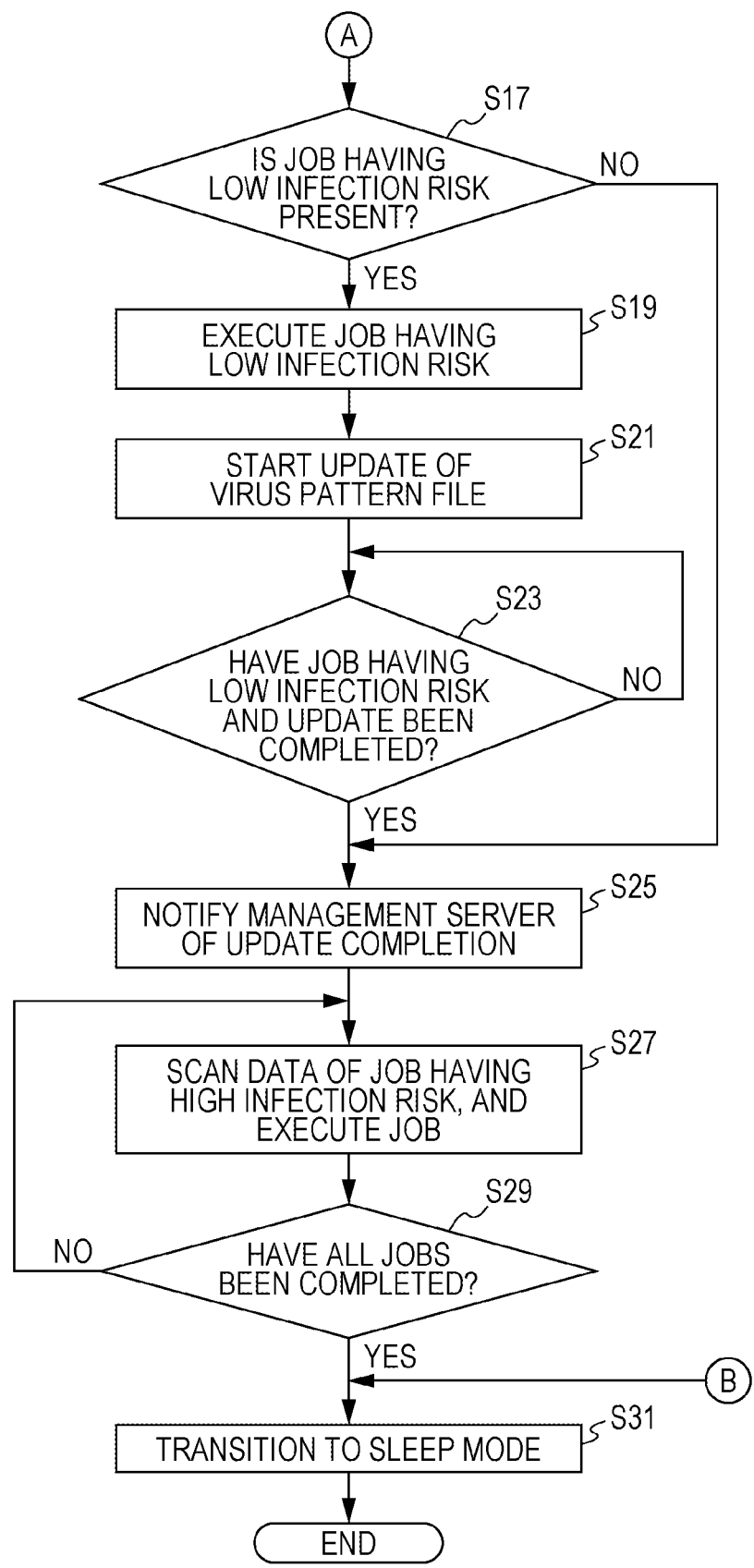
FIG. 8 is a second part of the flowchart of the operation of the image forming apparatus according to the first embodiment of the present disclosure.

FIGS. 7 and 8 illustrate a flowchart of the operation of the image forming apparatus 100 according to the first embodiment of the present disclosure.

Referring to FIG. 7, the sleep-mode controller 109 of the image forming apparatus 100 discriminates whether an operation from the operation panel 120 or entry of a job from external equipment has been accepted (S1). Until discriminating that an operation from the operation panel 120 or entry of a job from external equipment has been accepted, the sleep-mode controller 109 repeats the processing at step S1.

In a case where discriminating that an operation from the operation panel 120 or entry of a job from external equipment has been accepted, at step S1 (YES at S1), the sleep-mode controller 109 discriminates whether recovery from the sleep mode to the normal mode is required (S3).

In a case where discriminating that no recovery from the sleep mode to the normal mode is required, at step S3 (NO at S3), the sleep-mode controller 109 proceeds to the processing at step S1.

In a case where discriminating that recovery from the sleep mode to the normal mode is required, at step S3 (YES at S3), the sleep-mode controller 109 performs recovery operation (S5), to cause the image forming apparatus 100 to recover into the normal mode.

After the recovery into the normal mode, the CPU 101 connects to the management server 200 (S7), and discriminates whether the virus pattern file retained by the image forming apparatus 100 is the latest version, on the basis of a reply from the management server 200 (S9).

In a case where it is discriminated that the virus pattern file retained by the image forming apparatus 100 is not the latest version, at step S9 (NO at S9), the virus pattern file retained by the image forming apparatus 100 requires updating. In this case, on the basis of the respective types of a plurality of unexecuted jobs accepted until now, the CPU 101 determines the respective viral infection risks of the plurality of unexecuted jobs (S11). Next, the CPU 101 determines the order of execution of the plurality of unexecuted jobs, on the basis of the determined viral infection risks (S13), and proceeds to the processing at step S17 of FIG. 8.

In a case where it is discriminated that the virus pattern file retained by the image forming apparatus 100 is the latest version, at step S9 (YES at S9), the virus pattern file retained by the image forming apparatus 100 requires no updating. In this case, the CPU 101 executes the plurality of unexecuted jobs in the order of acceptance (S15), and proceeds to the processing at step S31 of FIG. 8 after completion of all the jobs.

Referring to FIG. 8, at step S17, the CPU 101 discriminates whether the job having a low viral infection risk is present (S17).

In a case where discriminating that no job having a low viral infection risk is present, at step S17 (NO at S17), the CPU 101 proceeds to the processing at step S25.

In a case where discriminating that the job having a low viral infection risk is present, at step S17 (YES at S17), the CPU 101 executes the job having a low viral infection risk in the determined order of execution (S19), and starts the update processing of the virus pattern file (S21). Subsequently, the CPU 101 discriminates whether all the jobs having a low viral infection risk have been completed and the update processing has been completed (S23). Until discriminating that all the jobs having a low viral infection risk have been completed and the update processing has been completed, the CPU 101 repeats the processing at step S23.

In a case where discriminating that all the jobs having a low viral infection risk have been completed and the update processing has been completed, at step S23 (YES at S23), the CPU 101 notifies the management server 200 of the completion of update of the virus pattern file (S25). In the determined order of execution, the CPU 101 executes virus scanning to the data of the job having a high viral infection risk and then executes the job having a high viral infection (S27). Subsequently, the CPU 101 discriminates whether all the jobs have been completed (S29).

In a case where discriminating that all the jobs have not been completed yet, at step S29 (NO at S29), the CPU 101 proceeds to the processing at step S27.

In a case where it is discriminated that all the jobs have been completed, at step S29 (YES at S29), the sleep-mode controller 109 causes the image forming apparatus 100 to transition from the normal mode to the sleep mode (S31). Then, the processing finishes.

Figure 9:
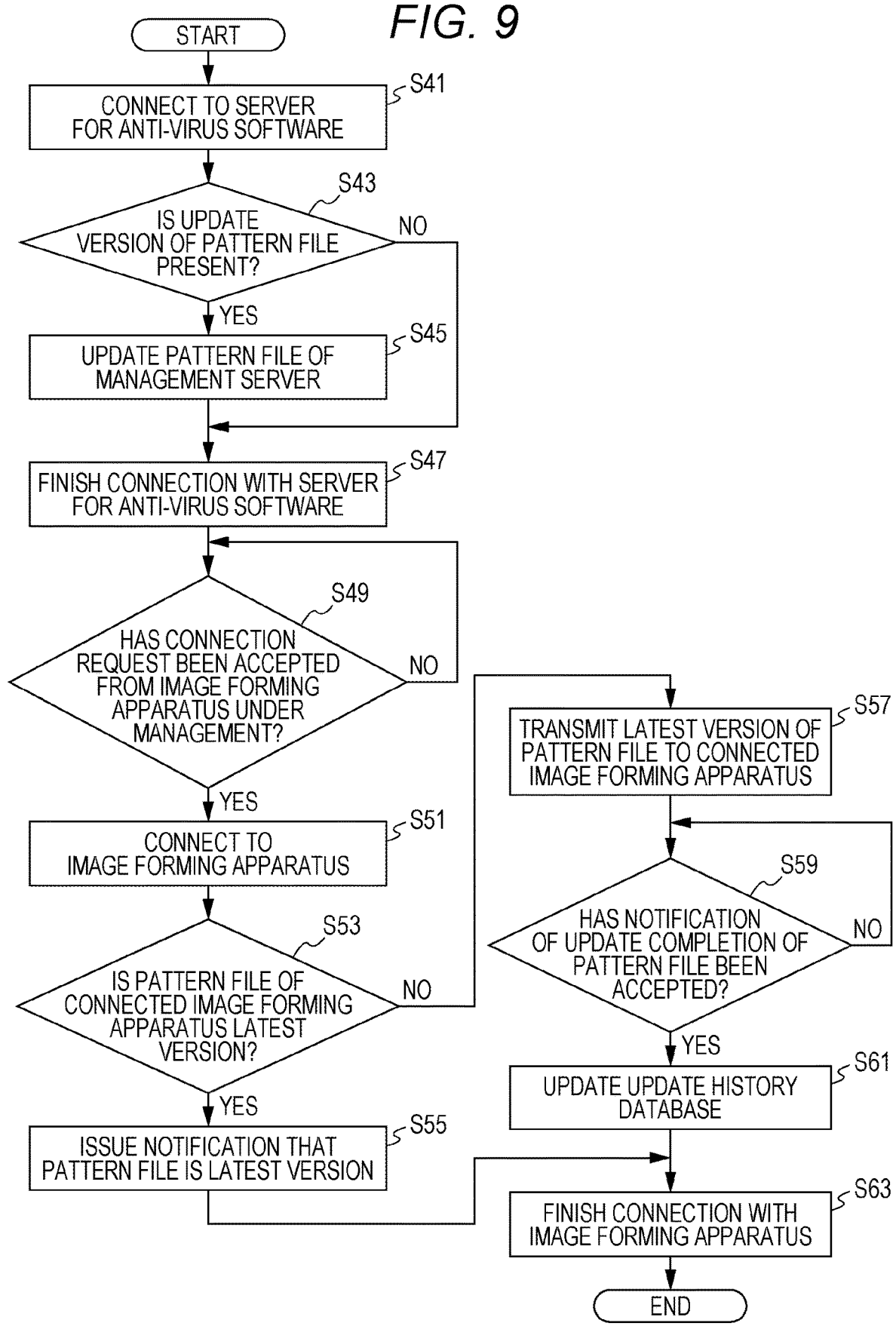
FIG. 9 is a flowchart of the operation of the management server according to the first embodiment of the present disclosure.

FIG. 9 is a flowchart of the operation of the management server 200 according to the first embodiment of the present disclosure.

Referring to FIG. 9, the CPU 201 of the management server 200 connects to the cloud server 500 managed by the service provider for anti-virus software, at necessary timing (S41), and discriminates whether the cloud server 500 retains the update version of virus pattern file (latest version) (virus pattern file newer in version than the virus pattern file retained by the management server 200) (S43).

In a case where discriminating that the cloud server 500 retains the update version of virus pattern file, at step S43 (YES at S43), the CPU 201 acquires the update version of virus pattern file from the cloud server 500 and updates the virus pattern file retained by the management server 200 (S45). Then, the CPU 201 proceeds to the processing at step S47. In the processing at step S45, the version information regarding the virus pattern file retained by the management server 200, is updated.

In a case where discriminating that the cloud server 500 retains no update version of virus pattern file, at step S43 (NO at S43), the CPU 201 proceeds to the processing at step S47.

The CPU 201 finishes the connection with the cloud server 500, at step S47 (S47), and discriminates whether a connection request has been accepted from the image forming apparatus 100 under the management of the management server 200 (S49). Until discriminating that a connection request has been accepted from the image forming apparatus 100 under the management of the management server 200, the CPU 201 repeats the processing at step S49.

In a case where discriminating that a connection request has been accepted from the image forming apparatus 100 under the management of the management server 200, at step S49 (YES at S49), the CPU 201 connects to the image forming apparatus 100 that has made the connection request (S51), and discriminates whether the version of the virus pattern file of the connected image forming apparatus 100 is the latest version (identical to the version of the virus pattern file retained by the management server 200) (S53). The discrimination is performed with reference to the update history database.

In a case where discriminating that the version of the virus pattern file of the connected image forming apparatus 100 is the latest version, at step S53 (YES at S53), the CPU 201 notifies the connected image forming apparatus 100 that the virus pattern file is the latest version (S55), and finishes the connection with the image forming apparatus 100 (S63). Then, the processing finishes.

In a case where discriminating that the version of the virus pattern file of the connected image forming apparatus 100 is not the latest version, at step S53 (NO at S53), the CPU 201 transmits the latest version of virus pattern file to the connected image forming apparatus 100 (S57), and discriminates whether a notification of update completion of the virus pattern file has been accepted from the connected image forming apparatus 100 (S59). Until discriminating that a notification of update completion of the virus pattern file has been accepted from the connected image forming apparatus 100, the CPU 201 repeats the processing at step S59.

In a case where discriminating that a notification of update completion of the virus pattern file has been accepted from the connected image forming apparatus 100, at step S59 (YES at S59), the CPU 201 updates the update history database (S61), and finishes the connection with the image forming apparatus 100 (S63). Then, the processing finishes.

According to the present embodiment, the image forming apparatus 100 that has recovered from the sleep mode, executes, when the virus pattern file retained by the image forming apparatus 100 requires updating, the job using data acquired from outside the image forming apparatus 100, after update completion of the virus pattern file. This arrangement enables avoidance of a situation in which the image forming apparatus 100 executes the job having a high viral infection risk with the virus pattern file that has not been updated due to the sleep mode. Thus, the possibility of viral infection of the image forming apparatus 100 can be reduced.

Because the image forming apparatus 100 executes the job having a low viral infection risk before update completion of the virus pattern file, a reduction can be made in the waiting time of the user due to the update processing of the virus pattern file.

Second Embodiment

According to the present embodiment, before completion of update of a virus pattern file, a CPU 101 of an image forming apparatus 100 accepts, from an operation panel 120, an operation for execution of a specific job including a plurality of tasks including an external task (task of making access outside the image forming apparatus 100) and a general task that is not the external task (task of making no access outside the image forming apparatus 100). The CPU 101 that has accepted the operation, executes, when discriminating that the virus pattern file stored in a storage device 110 is not the latest version, the plurality of tasks in the specific job in the order of execution changed from the order of execution of the plurality of tasks when discriminating that the virus pattern file stored in the storage device 110 is the latest version.

Hereinafter, the order of execution of the plurality of tasks in the specific job in a case where it is discriminated that the virus pattern file stored in the storage device 110 is not the latest version, is also referred to as the order of execution of tasks in update of the virus pattern file. The order of execution of the plurality of tasks in the specific job in a case where it is discriminated that the virus pattern file stored in the storage device 110 is the latest version, is also referred to as the order of execution of tasks in normal processing.

The specific job is, for example, a job of processing data saved in a storage device outside the image forming apparatus 100. Here, a case where the specific job is USB print, will be described.

The storage device 110 stores sequence information different every type of job that the image forming apparatus 100 executes. In a case where a key regarding the USB print is depressed on the operation panel 120, the CPU 101 determines that an operation for execution of the USB print has been accepted (the operation is not intended to issue an instruction for immediate execution of the USB print, but is intended for display of a screen that accepts various settings of the USB print). The CPU 101 that has accepted the operation, selects the sequence information 114 regarding the USB print from the plurality of pieces of sequence information stored in the storage device 110, and executes a plurality of tasks regarding the USB print in the order of execution based on the selected sequence information 114.

FIG. 10 is a schematic illustration of the sequence information 114 regarding the USB print stored in the storage device 110 of the image forming apparatus 100 according to a second embodiment of the present disclosure.

Referring to FIG. 10, the sequence information includes the order of execution of the plurality of tasks in the normal processing, in association with the possibility of viral infection in a case where each of the plurality of tasks is executed.

Here, the sequence information 114 regarding the USB print is indicated. Specifically, the sequence information 114 includes the task ID of each of the plurality of tasks in the USB print, the detail of the task (processing detail), the device as the access destination of the task, the order of execution of the task in the normal processing, the degree of viral infection risk in execution of the task, and the order of execution of the task in update of the virus pattern file.

For execution of the USB print in the normal processing, the sequence information 114 indicates the order of execution of the tasks of "folder/file verification for USB memory" (task of verifying a folder and a file in the USB memory), "file open for USB memory" (task of opening a file saved in the USB memory), "panel display of operation menu" (task of displaying print conditions), "user input acceptance of operation parameters" (task of accepting input of parameters for print conditions), "file print processing" (task of creating print data), "print screen preview display", "print setting final verification", "print processing", and "file close for USB memory".

Here, the sequence information 114 indicates that "panel display of operation menu", "user input acceptance of operation parameters", "print screen preview display", and "print setting final verification" in the tasks in the USB print belong to a task of making connection to a display 121 (liquid crystal display (LCD) panel), namely, the general task. The general task is low in viral infection risk. Meanwhile, a task of making access to the USB memory belongs to the external task, and is high in viral infection risk.

In the item of the order of execution of the tasks in update of the virus pattern file, the term "Pre" means executable before update completion of the virus pattern file, and the term "After" means the necessity of execution after update completion of the virus pattern file.

In the sequence information 114, the order of execution of the tasks in update of the virus pattern file is different from the order of execution of the tasks in the normal processing. In update of the virus pattern file, the external task is executed after completion of the update of the virus pattern file. In update of the virus pattern file, at least part of the general task is executed prior to the external task.

Specifically, the tasks of "panel display of operation menu" and "user input acceptance of operation parameters" belonging to the general task having a low viral infection risk, are denoted with "Pre1" and "Pre2", respectively, and are executed before update completion of the virus pattern file and before the task having a high viral infection risk. Meanwhile, the external task having a high viral infection risk is executed after update completion of the virus pattern file and after the general task of "panel display of operation menu" and "user input acceptance of operation parameters". Note that, although "print screen preview display" and "print setting final verification" belong to the general task having a low viral infection risk, the external task having a high viral infection risk, such as "file print processing", requires previously executing for execution of the tasks. Thus, the tasks are executed after update completion of the virus pattern file.

Figure 11:
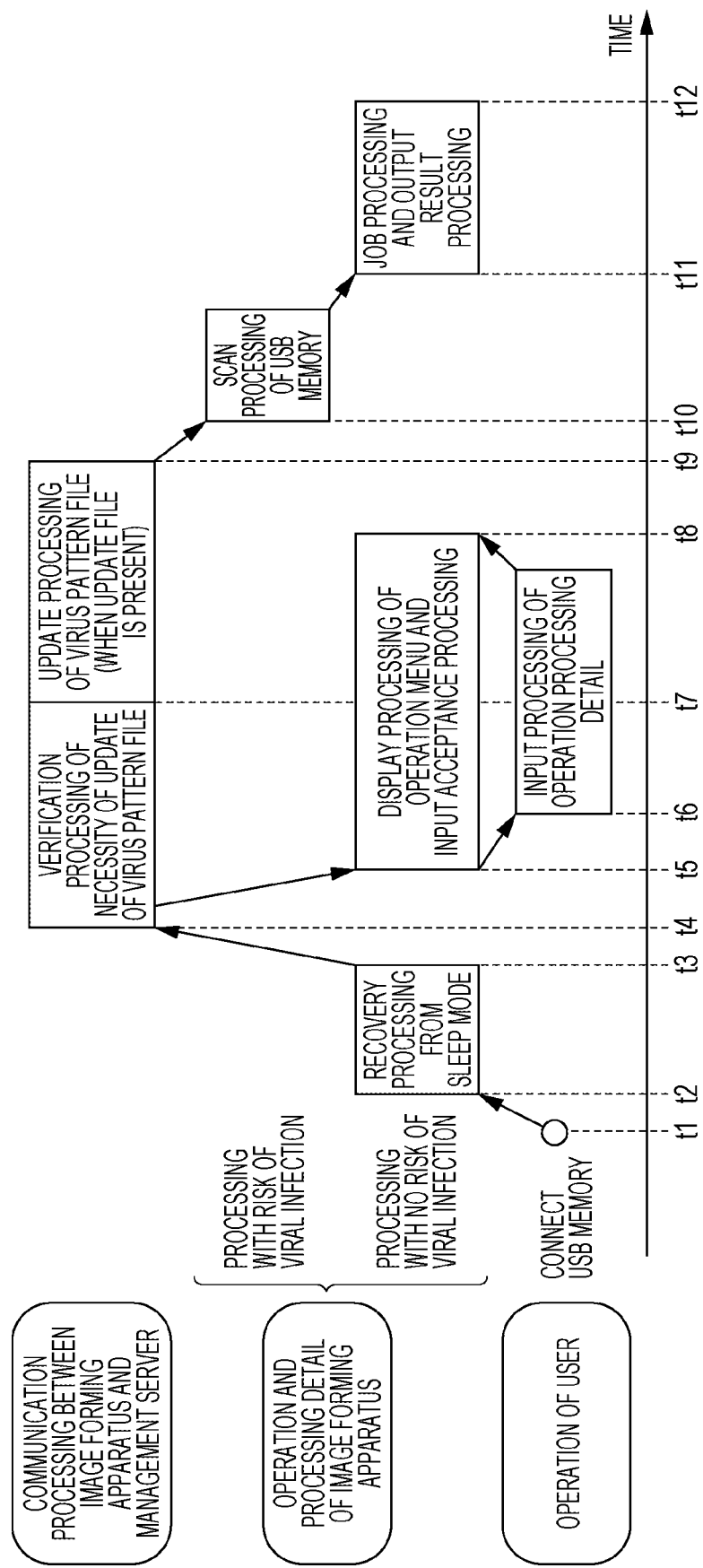
FIG. 11 is a conceptual illustration of an operation of a user (acceptance operation from the user), the operation and processing detail of the image forming apparatus, and a timing sequence of communication processing between the image forming apparatus and a management server, according to the second embodiment of the present disclosure.

FIG. 11 is a conceptual illustration of an operation of a user (acceptance operation from the user), the operation and processing detail of the image forming apparatus 100, and a timing sequence of communication processing between the image forming apparatus 100 and a management server 200, according to the second embodiment of the present disclosure.

At time t1, the user connects an USB memory to an USB terminal 123 of the image forming apparatus 100 in a sleep mode, and performs the operation for execution of the USB print for printing document data saved in the USB memory, on the operation panel 120. In the image forming apparatus 100, a sensor 124 detects the insertion of the USB memory and an operator 122 accepts the operation for execution of the USB print.

From time t2 to time t3, the image forming apparatus 100 performs recovery processing from the sleep mode to a general mode, after the sensor 124 detects the insertion of the USB memory. The image forming apparatus 100 selects the sequence information 114 regarding the USB print, after the operator 122 accepts the operation for execution of the USB print.

After recovery to the general mode, from time t4 to time t7, the image forming apparatus 100 inquires of the management server 200 whether the virus pattern file retained by the image forming apparatus 100 is the latest version. The inquiry is made before acceptance of an instruction for execution of the USB print.

The management server 200 compares an update history of the image forming apparatus 100 described in an update history database, with version information regarding the virus pattern file retained by the management server 200. In a case where the virus pattern file retained by the image forming apparatus 100 is not the latest version, the management server 200 makes a reply indicating the result, to the image forming apparatus 100, and transmits the virus pattern file retained by the management server 200, to the image forming apparatus 100.

From time t7 to time t9, the image forming apparatus 100 determines that the virus pattern file retained by the image forming apparatus 100 requires updating. The image forming apparatus 100 updates the virus pattern file retained by the image forming apparatus 100, to the virus pattern file received from the management server 200.

After receiving the reply indicating that the virus pattern file retained by the image forming apparatus 100 is not the latest version, from the management server 200, the image forming apparatus 100 executes the plurality of tasks in the USB print in the order of execution in update of the virus pattern file, with reference to the sequence information 114 regarding the USB print. From time t5 to t8, the image forming apparatus 100 performs display processing of the operation menu (menu regarding setting the print conditions in the USB print), and performs input acceptance processing of accepting an input from the user for operation processing detail (settings in the print conditions). Thus, the execution of the general task in parallel to the update of the virus pattern file, enables a reduction in the waiting time of the user due to the update of the virus pattern file.

The display processing of the operation menu and the input acceptance processing that the image forming apparatus 100 performs, finish at time t8, but the update of the virus pattern file has not been completed at the point of time t8. Thus, for the purpose of preventing viral infection, the remaining task (task requiring connecting to the USB memory) after time t8 is suspended until update completion of the virus pattern file.

After completion of the update of the virus pattern file retained by the image forming apparatus 100, at time t10, access is made to the document data in the USB memory inserted by the user. The image forming apparatus 100 executes virus scanning to the document data in the USB memory, with the updated virus pattern file.

In a case where no virus is detected from the document data in the USB memory, from time t11 to time t12, the image forming apparatus 100 executes the remaining task in the USB print. In a case where a virus is detected from the document data in the USB memory, the image forming apparatus 100 notifies the user of the detected virus, and performs necessary processing, such as viral disinfection.

Figure 12:
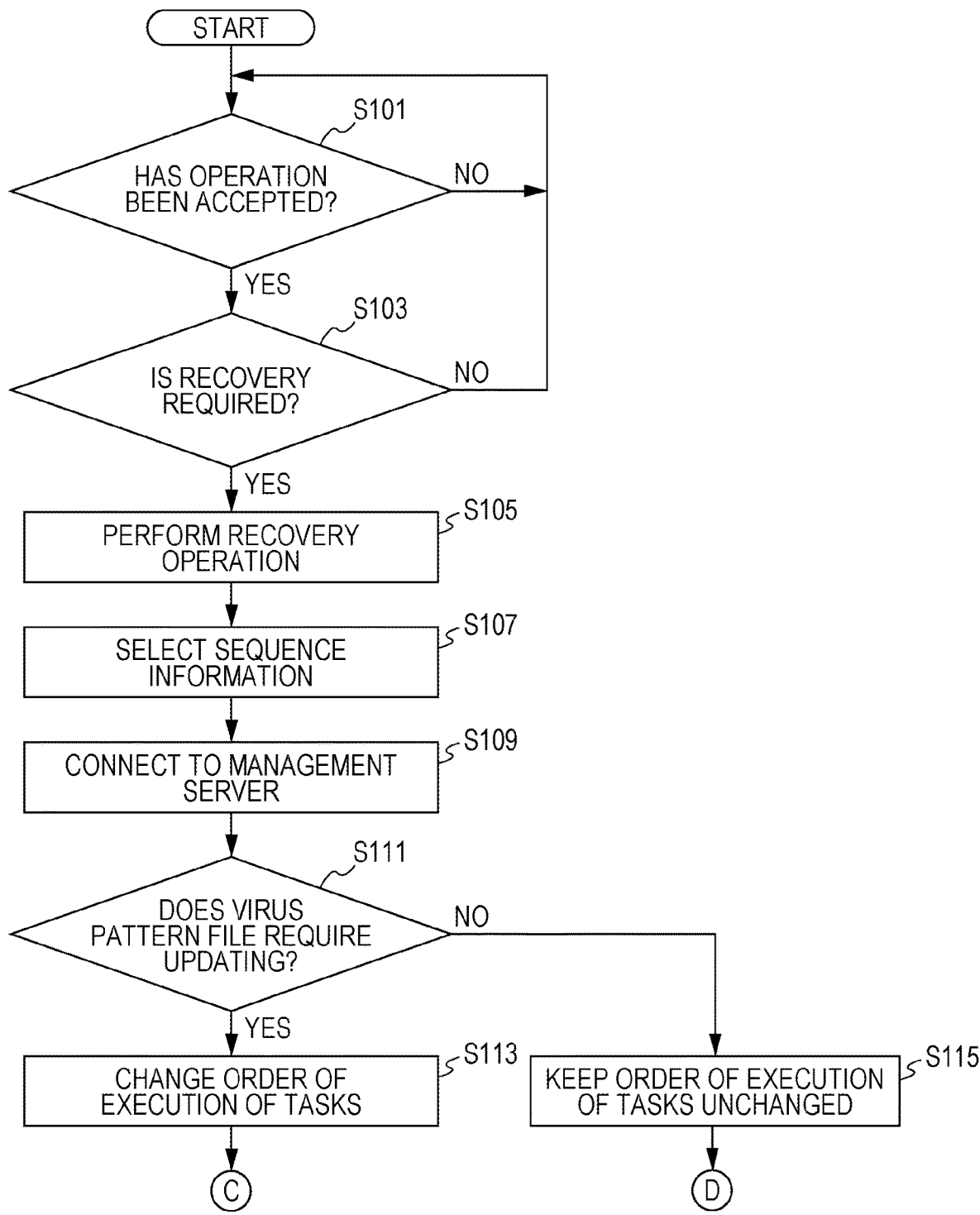
FIG. 12 is a first part of a flowchart of the operation of the image forming apparatus according to the second embodiment of the present disclosure.
Figure 13:
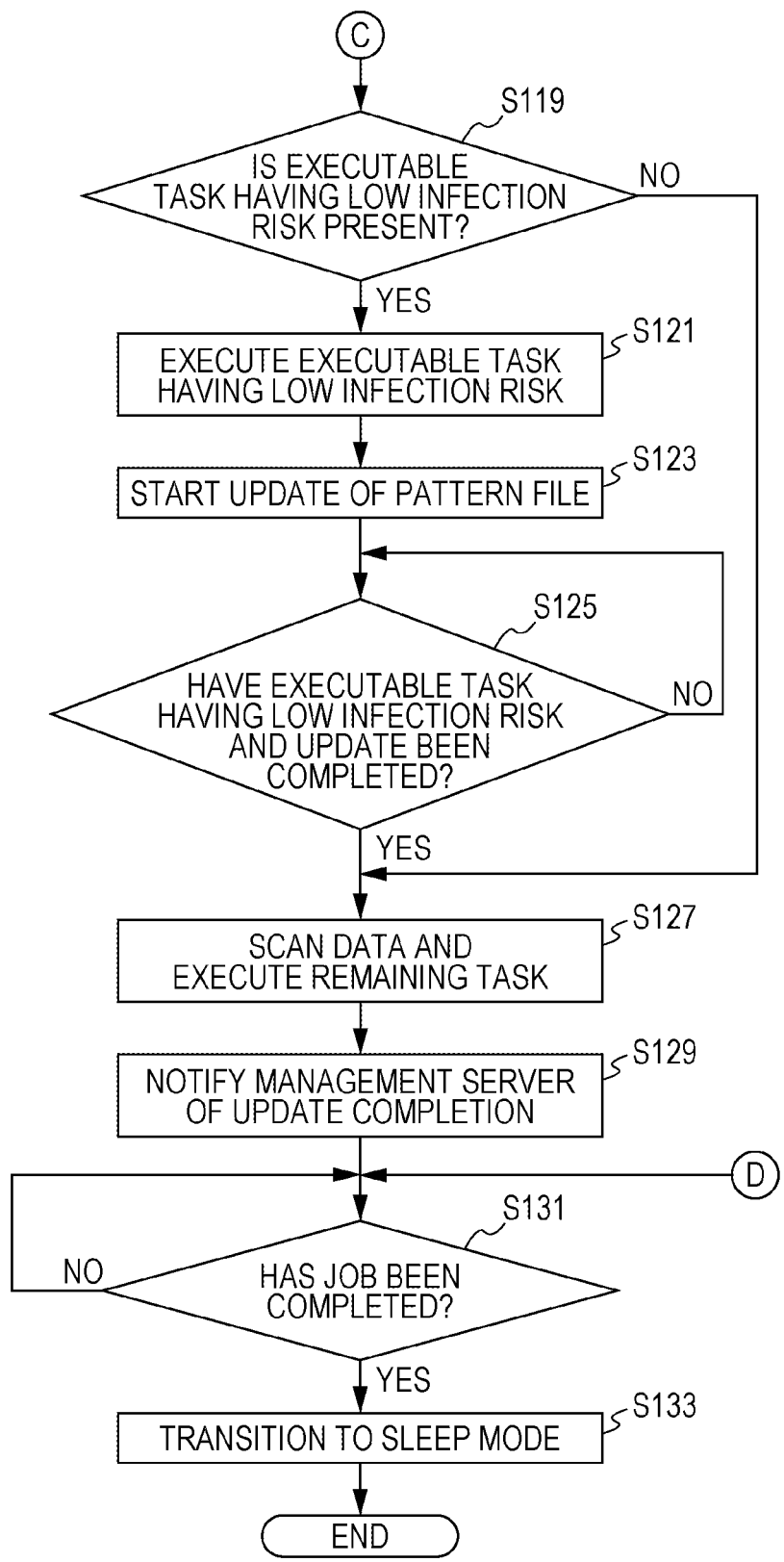
FIG. 13 is a second part of the flowchart of the operation of the image forming apparatus according to the second embodiment of the present disclosure.

FIGS. 12 and 13 illustrate a flowchart of the operation of the image forming apparatus 100 according to the second embodiment of the present disclosure.

Referring to FIG. 12, a sleep-mode controller 109 of the image forming apparatus 100 discriminates whether the operation for execution of the specific job has been accepted (S101). Until it is discriminated that the operation for execution of the specific job has been accepted, the CPU 101 repeats the processing at step S101.

In a case where discriminating that the operation for execution of the specific job has been accepted, at step S101 (YES at S101), the sleep-mode controller 109 discriminates whether recovery from the sleep mode to the normal mode is required (S103).

In a case where discriminating that no recovery from the sleep mode to the normal mode is required, at step S103 (NO at S103), the sleep-mode controller 109 proceeds to the processing at step S101.

In a case where discriminating that recovery from the sleep mode to the normal mode is required, at step S103 (YES at S103), the sleep-mode controller 109 performs recovery operation (S105). After recovery to the normal mode, the CPU 101 selects the sequence information based on the accepted operation (S107). Next, the CPU 101 connects to the management server 200, and inquires of the management server 200 whether the virus pattern file retained by the image forming apparatus 100 is the latest version (S109). Subsequently, the CPU 101 discriminates whether the virus pattern file retained by the image forming apparatus 100 requires updating, on the basis of a reply from the management server 200 (S111).

In a case where discriminating that the virus pattern file retained by the image forming apparatus 100 requires updating, at step S111 (YES at S111), the CPU 101 changes the order of execution of the plurality of tasks in the specific job, on the basis of the sequence information 114 (S113), and proceeds to the processing at step S119 of FIG. 13.

In a case where discriminating that the virus pattern file retained by the image forming apparatus 100 requires no updating, at step S111 (NO at S111), the CPU 101 does not change the order of execution of the plurality of tasks in the specific job (S115), and proceeds to the processing at step S131 of FIG. 13.

Referring to FIG. 13, at step S119, the CPU 101 discriminates whether an executable task having a low infection risk is present (S119). When discriminating that no executable task having a low infection risk is present, at step S119 (NO at S119), the CPU 101 proceeds to the processing at step S127.

In a case where discriminating that an executable task having a low infection risk is present, at step S119 (YES at S119), the CPU 101 executes the executable task having a low infection risk (S121), and starts update of the virus pattern file (S123). Next, the CPU 101 discriminates whether the executable task having a low infection risk and the update of the virus pattern file have been completed (S125). Until discriminating that the executable task having a low infection risk and the update of the virus pattern file have been completed, the CPU 101 repeats the processing at step S125.

In a case where discriminating that the executable task having a low infection risk and the update of the virus pattern file have been completed, at step S125 (YES at S125), the CPU 101 executes virus scanning to data to be used in the task, and executes the remaining task (S127). Next, the CPU 101 notifies the management server 200 of the update completion of the virus pattern file (S129), and discriminates whether the job has been completed (S131). Until discriminating that the job has been completed, the CPU 101 repeats the processing at step S131.

In a case where it is discriminated that the job has been completed, at step S131 (YES at S131), the sleep-mode controller 109 causes the image forming apparatus 100 to transition from the normal mode to the sleep mode (S133). Then the processing finishes.

Note that the configuration and the operation of the image forming system except for the above, are similar to those according to the first embodiment, and thus the descriptions thereof will be omitted.

According to the present embodiment, the image forming apparatus 100 that has accepted the operation for execution of the specific job and has recovered from the sleep mode, executes, when the virus pattern file retained by the image forming apparatus 100 requires updating, at least part of the general task prior to the external task in the plurality of tasks in the specific job. This arrangement enables avoidance of a situation in which the image forming apparatus 100 executes the external task with the virus pattern file that has not been updated due to the sleep mode. Thus, the possibility of viral infection of the image forming apparatus 100 can be reduced.

Because the image forming apparatus 100 executes at least part of the general task before update completion of the virus pattern file, a reduction can be made in the waiting time of the user due to the update processing of the virus pattern file.

Third Embodiment

According to the present embodiment, an example in which a management server 200 manages a plurality of image forming apparatuses 100 and the management server 200 independently updates a virus pattern file retained by each of the plurality of image forming apparatuses 100, will be described.

Figure 14:
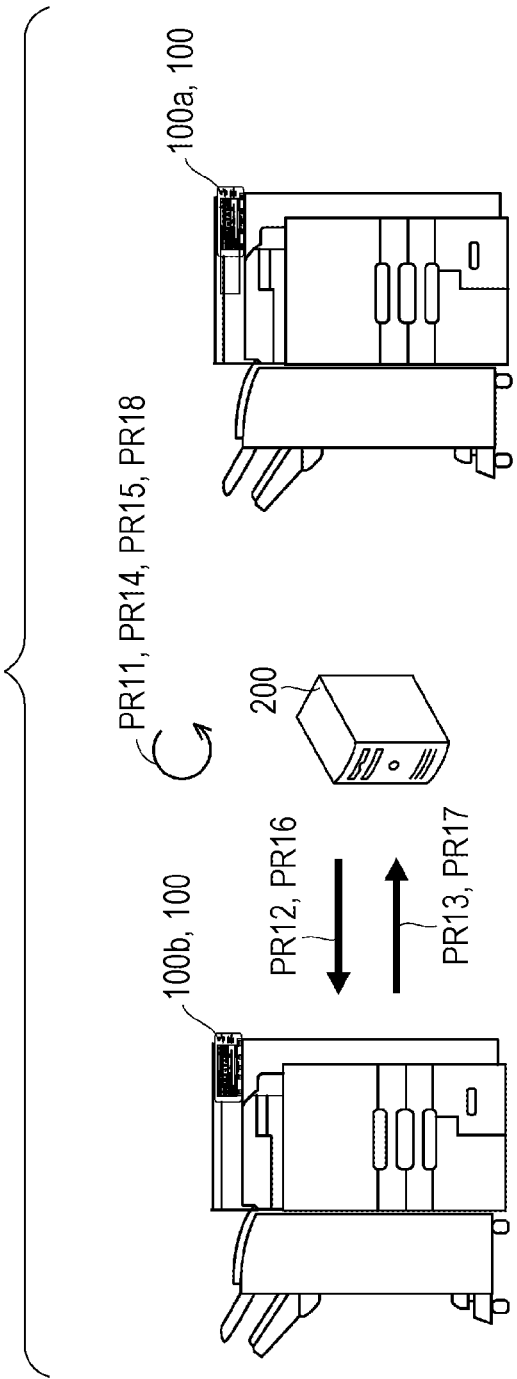
FIG. 14 is a schematic illustration of the operation of an image forming system according to a third embodiment of the present disclosure.

FIG. 14 is a schematic illustration of the operation of an image forming system according to a third embodiment of the present disclosure.

Referring to FIG. 14, here, the management server 200 manages two image forming apparatuses 100a and 100b. The image forming apparatus 100a high in usage rate due to users, has a virus pattern file that is the latest version. The image forming apparatus 100a executes virus scanning, frequently. Meanwhile, the image forming apparatus 100b low in usage rate due to users, has a virus pattern file that is an old version because of no updating. The image forming apparatus 100b has not performed virus scanning for a long time.

The management server 200 determines whether the virus pattern file retained by each of the plurality of image forming apparatuses 100 in the image forming system is the latest version, at necessary timing (e.g., at certain periods of time) (processing PR11). The determination is performed in comparison between version information regarding the virus pattern file stored in a storage device 205 and an update history of each of the plurality of image forming apparatuses 100 described in an update history database.

In a case where determining that the virus pattern file retained by the image forming apparatus 100 is not the latest version, the management server 200 determines that the virus pattern file requires updating. The management server 200 performs the following processing PR12 to PR14 to the image forming apparatus 100b having the virus pattern file requiring updating.

The management server 200 transmits the virus pattern file retained by the management server 200, to the image forming apparatus 100b, and requests the image forming apparatus 100b to update the virus pattern file (processing PR12).

After completion of the update of the virus pattern file, the image forming apparatus 100b notifies the management server 200 of the update completion. When receiving the notification of the update completion from the image forming apparatus 100b (processing PR13), the management server 200 updates the update history of the image forming apparatus 100b in the update history database (processing PR14).

Note that, in a case where determining that the virus pattern file retained by the image forming apparatus 100b is not the latest version, at the processing PR11, the management server 200 may discriminate whether the image forming apparatus 100b is in a sleep mode. In a case where discriminating that the image forming apparatus 100b is in a sleep mode, the management server 200 may cause the image forming apparatus 100b to recover from the sleep mode and may request the image forming apparatus 100b to update the virus pattern file retained by the image forming apparatus 100b after the recovery. In a case where causing the image forming apparatus 100b to recover from the sleep mode, the management server 200 may cause part necessary for update of the virus pattern file in the image forming apparatus 100b (e.g., a CPU 101, a ROM 102, a RAM 103, and a storage device 110) to recover from the sleep mode, partially.

After the processing PR11, the management server 200 determines whether each of the plurality of image forming apparatuses 100 in the image forming system requires virus scanning (processing PR15). The determination is performed in comparison between scan history of each of the image forming apparatuses 100 stored in the storage device 205 and the current date and time. In a case where the scan history of the image forming apparatus 100 is older than the current date and time by a predetermined time or more, the management server 200 determines that the image forming apparatus 100 requires virus scanning. In a case where the scan history of the image forming apparatus 100 is older than the current date and time by less than the predetermined time, the management server 200 determines that the image forming apparatus 100 requires no virus scanning.

Note that a method in which the management server 200 determines whether the image forming apparatus 100 requires virus scanning, may be the following method, instead of the method described above. The management server 200 requests the image forming apparatus 100 to transmit the scan history retained by the image forming apparatus 100 (in a case where the image forming apparatus 100 is in the sleep mode, the management server 200 requests the transmission after the image forming apparatus 100 recovers from the sleep mode to a normal mode). The management server 200 compares the scan history received from the image forming apparatus 100 with the current date and time, to determine whether the image forming apparatus 100 requires virus scanning. In this case, the management server 200 does not necessarily retain the scan history of the image forming apparatus 100.

The management server 200 performs the following processing PR16 to PR18 to the image forming apparatus 100b requiring virus scanning. The management server 200 requests the image forming apparatus 100b to execute virus scanning (processing PR16).

After completion of virus scanning, the image forming apparatus 100b notifies the management server 200 of the completion of virus scanning. When receiving the notification of the completion of virus scanning from the image forming apparatus 100b (processing PR17), the management server 200 updates the scan history of the image forming apparatus 100 (processing PR18).

Note that, when determining that virus scanning is not required to be executed or when receiving the notification of the completion of virus scanning, the management server 200 may cause the image forming apparatus 100 to transition to the sleep mode.

Figure 15:
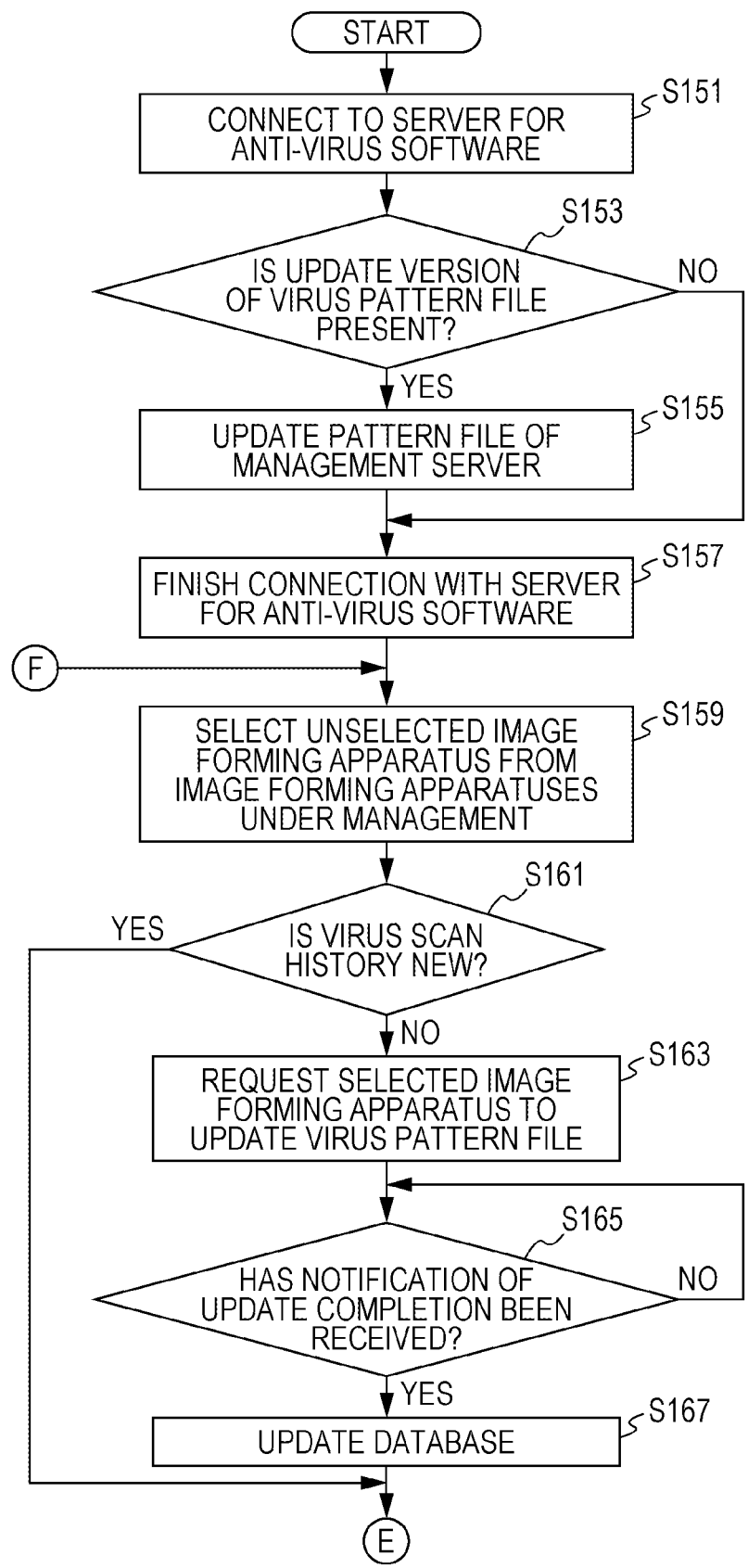
FIG. 15 is a first part of a flowchart of the operation of a management server according to the third embodiment of the present disclosure.
Figure 16:
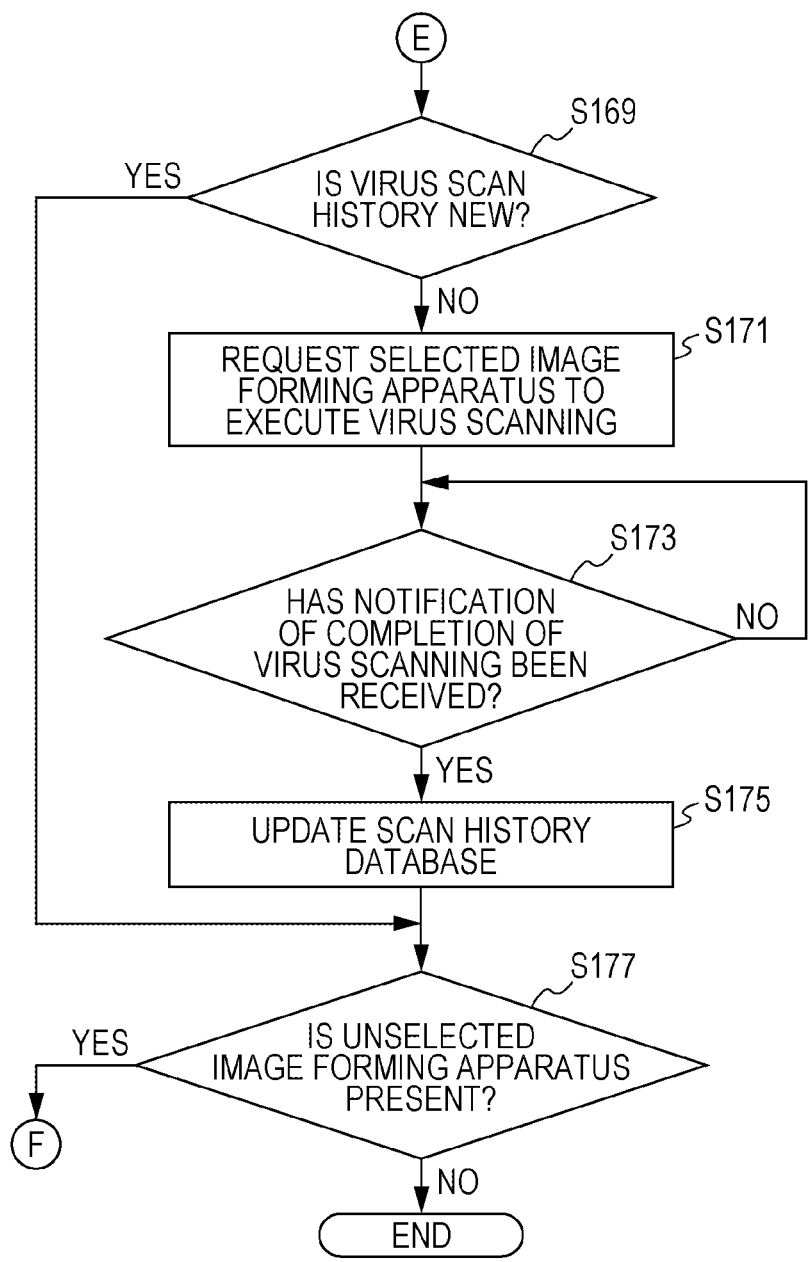
FIG. 16 is a second part of the flowchart of the operation of the management server according to the third embodiment of the present disclosure.

FIGS. 15 and 16 illustrate a flowchart of the operation of the management server 200 according to the third embodiment of the present disclosure.

Referring to FIG. 15, a CPU 201 of the management server 200 first performs the processing at steps S151 to S157 similar to the processing at steps S41 to S47 in FIG. 9. Subsequently to the processing at step S157, the CPU 201 selects an unselected image forming apparatus 100 from the image forming apparatuses 100 under management (S159), and discriminates whether the virus pattern file of the selected image forming apparatus 100 is the latest version (S161).

In a case where discriminating that the virus pattern file of the selected image forming apparatus 100 is the latest version, at step S161 (YES at S161), the CPU 201 proceeds to the processing at step S169 of FIG. 16.

In a case where discriminating that the virus pattern file of the selected image forming apparatus 100 is not the latest version, at step S161 (NO at S161), the CPU 201 requests the selected image forming apparatus 100 to update the virus pattern file (S163). Subsequently, the CPU 201 discriminates whether a notification of update completion has been received (S165). Until discriminating that a notification of update completion has been received, the CPU 201 repeats the processing at step S165.

In a case where discriminating that a notification of update completion has been received, at step S165 (YES at S165), the CPU 201 updates the update history database (S167), and proceeds to the processing at step S169 of FIG. 16.

Referring to FIG. 16, at step S169, the CPU 201 discriminates whether the scan history of the selected image forming apparatus 100 is new (S169).

In a case where discriminating that the scan history of the selected image forming apparatus 100 is new, at step S169 (YES t S169), the CPU 201 proceeds to the processing at step S177.

In a case where discriminating that the scan history of the selected image forming apparatus 100 is not new, at step S169 (NO at S169), the CPU 201 requests the selected image forming apparatus 100 to execute virus scanning (S171), and discriminates whether a notification of completion of virus scanning has been received (S173). Until discriminating that a notification of completion of virus scanning has been received, the CPU 201 repeats the processing at step S173.

In a case where discriminating that a notification of completion of virus scanning has been received, at step S173 (YES at S173), the CPU 201 updates scan history database (S175), and discriminates whether an unselected image forming apparatus 100 is present (S177).

In a case where discriminating that an unselected image forming apparatus 100 is present, at step S177 (YES at S177), the CPU 201 proceeds to the processing at step S159 of FIG. 15.

In a case where discriminating that no unselected image forming apparatus 100 is present, at step S177 (NO at S177), the CPU 201 finishes the processing.

Figure 17:
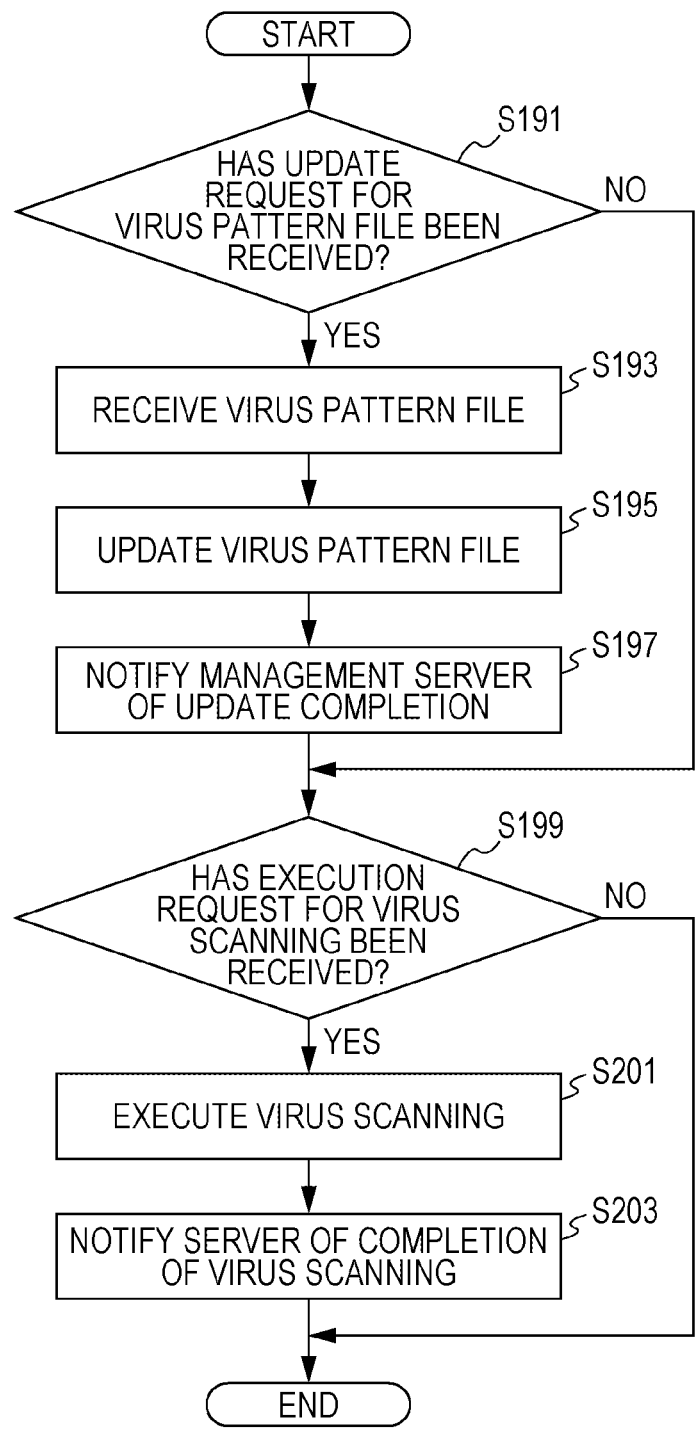
FIG. 17 is a flowchart of the operation of an image forming apparatus according to the third embodiment of the present disclosure.

FIG. 17 is a flowchart of the operation of the image forming apparatus 100 according to the third embodiment of the present disclosure.

Referring to FIG. 17, the CPU 101 of the image forming apparatus 100 discriminates whether an update request for the virus pattern file has been received from the management server 200 (S191).

In a case where discriminating that no update request for the virus pattern file has been received from the management server 200, at step S191 (NO at S191), the CPU 101 proceeds to the processing at step S199.

In a case where discriminating that an update request for the virus pattern file has been received from the management server 200, at step S191 (YES at S191), the CPU 101 receives the virus pattern file from the management server 200 (S193), and updates the virus pattern file retained by the image forming apparatus 100, to the received virus pattern file (S195). Subsequently, the CPU 101 notifies the management server 200 of update completion (S197), and discriminates whether an execution request for virus scanning has been received from the management server 200 (S199).

In a case where discriminating that no execution request for virus scanning has been received from the management server 200, at step S199 (NO at S199), the CPU 101 finishes the processing.

In a case where discriminating that an execution request for virus scanning has been received from the management server 200, at step S199 (YES at S199), the CPU 101 executes virus scanning (S201), and notifies the management server 200 of completion of the virus scanning (S203). Then, the processing finishes.

Note that the configuration and the operation of the image forming system except for the above, are similar to those according to the first embodiment, and thus the descriptions thereof will be omitted.

The present embodiment enables, in a case where the plurality of image forming apparatuses 100 is present under the management of the management server 200, avoidance of a situation in which variation occurs in the status of update of the virus pattern file due to the usage rate or the duration of the sleep mode of each of the plurality of image forming apparatuses 100. As a result, the possibility of viral infection of the image forming apparatuses 100 can be reduced.

[Others]

In the first or second embodiment, the image forming apparatus 100 may discriminate whether the virus pattern file retained by the image forming apparatus 100 is the latest version, in direct communication with the cloud server 500, instead of the management server 200. The operation of the management server 200 in the third embodiment may be performed by a cloud server 500, instead of the management server 200.

The processing in each embodiment described above, may be performed by software or by use of a hardware circuit. A program for performing the processing in each embodiment described above can be provided. The program recorded in a recording medium, such as a CD-ROM, a flexible disk, a hard disk, a ROM, a RAM, or a memory card, may be provided to a user. The program is executed by a computer, such as a CPU. The program may be downloaded to an apparatus through a communication line, such as the Internet.

Although embodiments of the present disclosure have been described and illustrated in detail, it should be considered that the disclosed embodiments are made for purposes of illustration and example only and not limitation in all the aspects. It is intended that the scope of the present disclosure should be interpreted by terms of the appended claims instead of the above descriptions and includes the meaning of equivalents of the scope of the claims and all alternations in the scope thereof.

As used throughout this application, the words "can" and "may" are used in a permissive sense (i.e., meaning having the potential to), rather than the mandatory sense (i.e., meaning must). The words "include", "including", and "includes" and the like mean including, but not limited to. As used herein, the singular form of "a", "an", and "the" include plural references unless the context clearly dictates otherwise. As employed herein, the term "number" shall mean one or an integer greater than one (i.e., a plurality).

Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

What is claimed is:

1. An image forming apparatus that communicates with a server, the image forming apparatus comprising:
   a storage that stores a virus pattern file; and
   a hardware processor,
   wherein the hardware processor discriminates, in a case where a transition is made from a state in which power supply to the hardware processor is interrupted to a state in which the power supply to the hardware processor is made, whether the virus pattern file stored in the storage is a latest version, in communication with the server,
   the hardware processor includes an updater that updates, in a case where the hardware processor discriminates that the virus pattern file stored in the storage is not the latest version, the virus pattern file stored in the storage to a virus pattern file acquired from the server,
   the hardware processor discriminates whether a job accepted is a first type of job using data acquired from outside the image forming apparatus or a second type of job using data generated inside the image forming apparatus, and
   the hardware processor executes the first type of job after the update by the updater.

2. The image forming apparatus according to claim 1, further comprising:
   an acceptor that accepts the job before completion of the update by the updater,
   wherein the hardware processor executes, in a case where the acceptor accepts the first type of job and accepts the second type of job after the acceptance of the first type of job, the second type of job prior to the first type of job.

3. The image forming apparatus according to claim 1, wherein the first type of job includes at least one of a print job of printing data received from outside the image forming apparatus and an e-mail reception job of receiving an e-mail from outside the image forming apparatus, and
   wherein the second type of job includes at least one of a scan job of reading an original image, a copy job of printing the read original image, and an e-mail transmission job of transmitting an e-mail outside the image forming apparatus.

4. An image forming apparatus that communicates with a server, the image forming apparatus comprising:
   a storage that stores a virus pattern file; and
   a hardware processor,
   wherein the hardware processor discriminates, in a case where a transition is made from a state in which power supply to the hardware processor is interrupted to a state in which the power supply to the hardware processor is made, whether the virus pattern file stored in the storage is a latest version, in communication with the server,
   wherein the hardware processor includes an updater that updates, in a case where the hardware processor discriminates that the virus pattern file stored in the storage is not the latest version, the virus pattern file stored in the storage to a virus pattern file acquired from the server, and
   wherein the hardware processor executes an external task that is a task of making access outside the image forming apparatus, after the update by the updater.

5. The image forming apparatus according to claim 4, further comprising:
   an operation acceptor that accepts an operation for execution of a specific job including a plurality of tasks including the external task and a general task that is a task of making no access outside the image forming apparatus, before completion of the update by the updater,
   wherein the hardware processor executes, when the hardware processor discriminates that the virus pattern file is not the latest version, in a case where the operation acceptor accepts the operation, the plurality of tasks in the specific job in an order of execution changed from an order of execution of the plurality of tasks in a case where the hardware processor discriminates that the virus pattern file is the latest version, and
   wherein the hardware processor executes at least part of the general task prior to the external task.

6. The image forming apparatus according to claim 5, wherein the storage further stores sequence information including the order of execution of the plurality of tasks in the case where the hardware processor discriminates that the virus pattern file is the latest version, in association with possibility of viral infection in a case where each of the plurality of tasks is executed, and
   wherein the hardware processor executes the plurality of tasks in the specific job in an order of execution changed, based on the sequence information.

7. The image forming apparatus according to claim 5, wherein the specific job includes a job of processing data saved in a storage outside the image forming apparatus.

8. A server that communicates with an image forming apparatus, the server comprising:
   a storage that stores a virus pattern file, the storage further storing an update history of a virus pattern file retained by the image forming apparatus;
   a hardware processor that discriminates whether the virus pattern file retained by the image forming apparatus is a latest version, based on the update history of the virus pattern file retained by the image forming apparatus; and
   an update requester that requests, in a case where the hardware processor discriminates that the virus pattern file retained by the image forming apparatus is not the latest version, the image forming apparatus to update the virus pattern file retained by the image forming apparatus to the virus pattern file stored in the storage,
   wherein the hardware processor discriminates, in the case where the hardware processor discriminates that the virus pattern file retained by the image forming apparatus is not the latest version, whether the image forming apparatus is in a sleep mode,
   wherein the server further comprises a recoverer that causes, in a case where the hardware processor discriminates that the image forming apparatus is in the sleep mode, the image forming apparatus to recover from the sleep mode, and
   wherein the update requester requests the image forming apparatus to update the virus pattern file retained by the image forming apparatus, after the recovery by the recoverer.

9. The server according to claim 8, wherein the recoverer causes part necessary for the update of the virus pattern file in the image forming apparatus, to recover from the sleep mode, partially.

10. The server according to claim 8, further comprising:
an update-completion receiver that receives, in a case where the update requester requests the image forming apparatus to update the virus pattern file retained by the image forming apparatus, a notification of update completion from the image forming apparatus,
wherein the hardware processor updates, in a case where the update-completion receiver receives the notification, the update history of the virus pattern file retained by the image forming apparatus stored in the storage.

11. The server according to claim 8,
wherein the hardware processor discriminates, based on an execution history of virus scanning by the image forming apparatus stored in the storage, the virus scanning is required to be executed in the image forming apparatus, after the discrimination by the hardware processor, and
wherein the server further comprises a scan requester that requests, in a case where the hardware processor discriminates that the virus scanning is required to be executed in the image forming apparatus, the image forming apparatus to execute the virus scanning.

12. The server according to claim 11, further comprising:
a scan-completion receiver that receives, in a case where the scan requester requests the image forming apparatus to execute the virus scanning, a notification of virus scanning completion from the image forming apparatus,
wherein the hardware processor updates, in a case where the scan-completion receiver receives the notification, the execution history of the virus scanning by the image forming apparatus stored in the storage.

13. The server according to claim 12, further comprising:
a sleep starter that causes, in a case where the hardware processor discriminates that the virus scanning is not required to be executed in the image forming apparatus or in the case where the scan-completion receiver receives the notification, the image forming apparatus to transition to a sleep mode.

14. A non-transitory recording medium storing a computer readable control program of an image forming apparatus that communicates with a server, the image forming apparatus including a storage that stores a virus pattern file and a hardware processor, the control program causing a computer to perform:
discriminating, in a case where a transition is made from a state in which power supply to the hardware processor is interrupted to a state in which the power supply to the hardware processor is made, whether the virus pattern file stored in the storage is a latest version, in communication with the server;
updating, in a case where it is discriminated that the virus pattern file stored in the storage is not the latest version in the discrimination, the virus pattern file stored in the storage to a virus pattern file acquired from the server;
discriminating whether a job accepted is a first type of job using data acquired from outside the image forming apparatus or a second type of job using data generated inside the image forming apparatus; and
executing the first type of job after the update.

15. A non-transitory recording medium storing a computer readable control program of a server that communicates with an image forming apparatus, the server including a storage that stores a virus pattern file, the storage further storing an update history of a virus pattern file retained by the image forming apparatus, the control program causing a computer to perform:
discriminating whether the virus pattern file retained by the image forming apparatus is a latest version, based on the update history of the virus pattern file retained by the image forming apparatus; and
requesting, in a case where it is discriminated that the virus pattern file retained by the image forming apparatus is not the latest version in the discrimination, the image forming apparatus to update the virus pattern file retained by the image forming apparatus to the virus pattern file stored in the storage,
wherein the computer discriminates, in the case where the computer discriminates that the virus pattern file retained by the image forming apparatus is not the latest version, whether the image forming apparatus is in a sleep mode,
wherein the server further includes a recoverer that causes, in a case where the computer discriminates that the image forming apparatus is in the sleep mode, the image forming apparatus to recover from the sleep mode, and
wherein the update requester requests the image forming apparatus to update the virus pattern file retained by the image forming apparatus, after the recovery by the recoverer.

* * * * *